United States Patent
Schneider et al.

(10) Patent No.: US 6,231,010 B1
(45) Date of Patent: May 15, 2001

(54) ADVANCED STRUCTURAL AND INFLATABLE HYBRID SPACECRAFT MODULE

(75) Inventors: William C. Schneider, Houston; Horacio M. de la Fuente; Gregg A. Edeen, both of Friendswood; Kriss J. Kennedy, League City; James D. Lester; Shalini Gupta, both of Houston; Linda F. Hess, Pearland; Chin H. Lin, Houston; Richard H. Malecki, Alvin; Jasen L. Raboin, League City, all of TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/236,785

(22) Filed: Jan. 25, 1999

(51) Int. Cl.[7] .............................. B64G 1/12; B64G 1/56; B64G 1/60
(52) U.S. Cl. ............................................................ 244/159
(58) Field of Search ............................. 244/158 R, 159, 244/173; 52/2.19

(56) References Cited

U.S. PATENT DOCUMENTS

| | | | |
|---|---|---|---|
| 3,144,219 | 8/1964 | Schnitzer | 244/159 |
| 3,169,725 | 2/1965 | Berglund | 244/173 X |
| 3,210,026 * | 10/1965 | Frisch | 244/159 |
| 3,364,631 * | 1/1968 | Pleasants | 244/173 X |
| 4,730,797 | 3/1988 | Minovitch | 244/159 |
| 4,792,108 | 12/1988 | Bull | 244/159 |
| 4,825,599 | 5/1989 | Swann, Jr. | 52/2 |
| 4,964,597 * | 10/1990 | Hijazi | 244/159 |
| 5,094,409 * | 3/1992 | King et al. | 244/159 X |
| 5,350,138 | 9/1994 | Culbertson et al. | 244/159 |
| 5,429,851 | 7/1995 | Sallee | 428/71 |
| 5,580,013 | 12/1996 | Velke | 244/159 |

* cited by examiner

Primary Examiner—Robert P. Swiatek
(74) Attorney, Agent, or Firm—Hardie R. Barr

(57) ABSTRACT

An inflatable module comprising a structural core and an inflatable shell, wherein the inflatable shell is sealingly attached to the structural core. In its launch configuration, the wall thickness of the inflatable shell is collapsed by vacuum. Also in this configuration, the inflatable shell is collapsed and efficiently folded around the structural core. Upon deployment, the wall thickness of the inflatable shell is inflated; whereby the inflatable shell itself, is thereby inflated around the structural core, defining therein a large enclosed volume. A plurality of removable shelves are arranged interior to the structural core in the launch configuration. The structural core also includes at least one longeron that, in conjunction with the shelves, primarily constitute the rigid, strong, and lightweight load-bearing structure of the module during launch. The removable shelves are detachable from their arrangement in the launch configuration so that, when the module is in its deployed configuration and launch loads no longer exist, the shelves can be rearranged to provide a module interior arrangement suitable for human habitation and work. In the preferred embodiment, to provide efficiency in structural load paths and attachments, the shape of the inflatable shell is a cylinder with semi-toroidal ends.

45 Claims, 14 Drawing Sheets

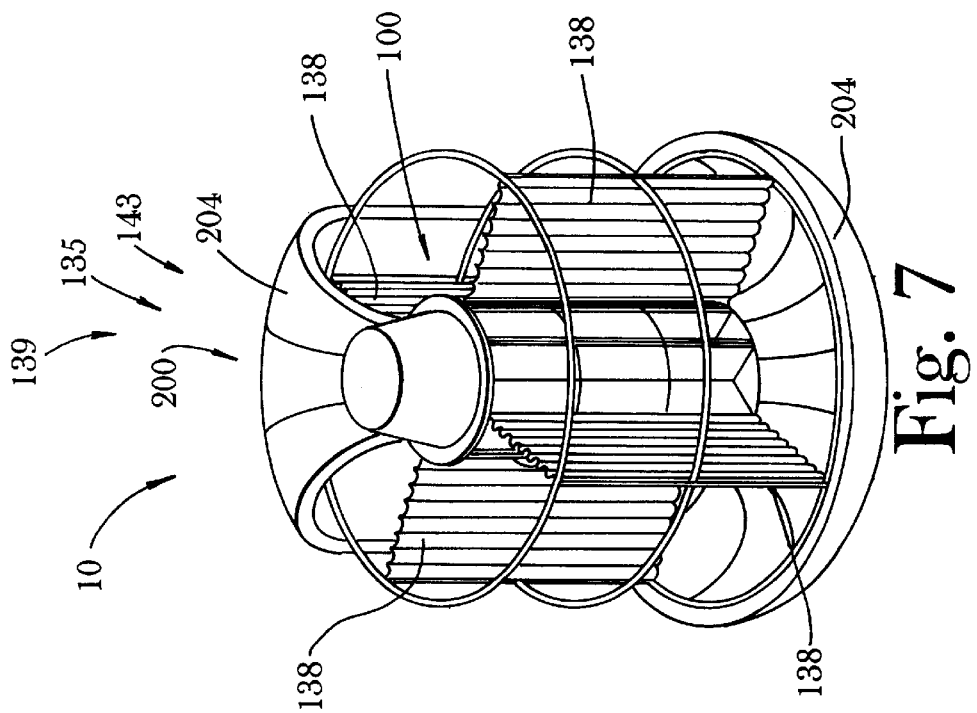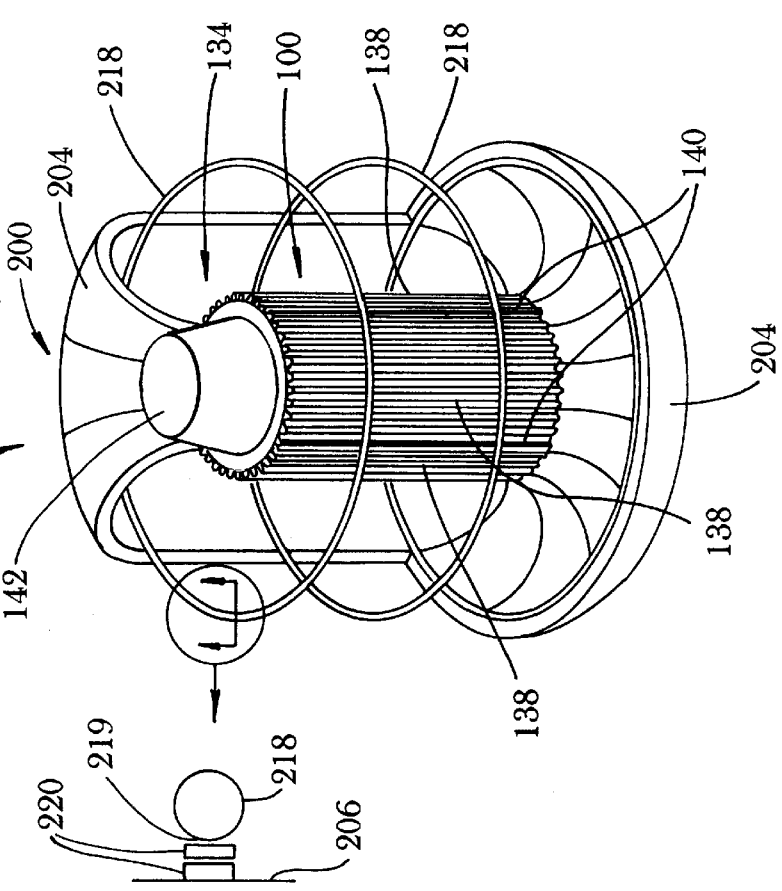

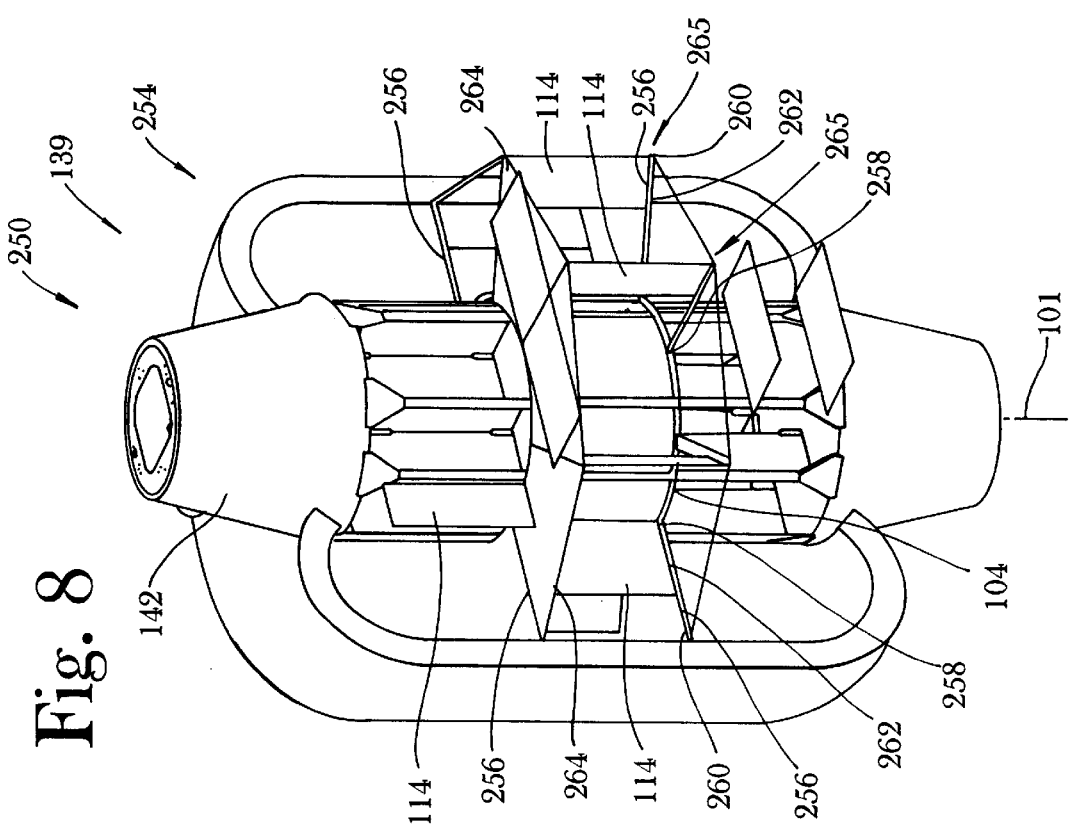

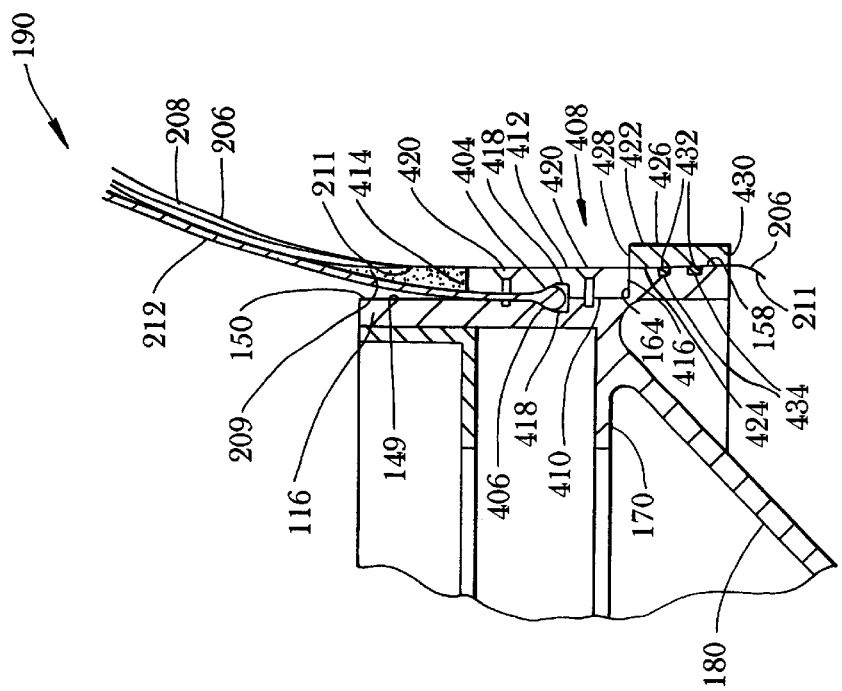
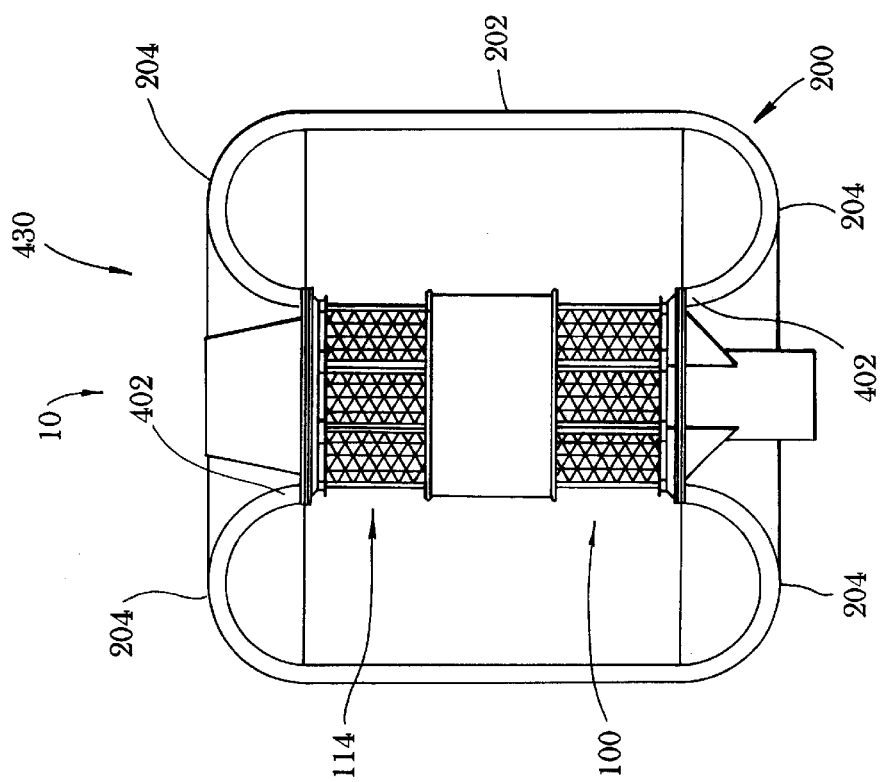
Fig. 14
Fig. 13

ADVANCED STRUCTURAL AND INFLATABLE HYBRID SPACECRAFT MODULE

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of Invention

This invention relates generally to a habitation or laboratory module capable of being used in space flight. In particular, this invention relates to such a module that is lightweight, collapsible and compact prior to space flight, and is capable of being subsequently enlarged to provide an adequately large volume for human habitation, laboratory work, and space flight.

In general, modules for use in space can either be assembled on earth and transported into orbit or can be assembled in orbit with their individual parts being transported from earth. Each method of assembly has advantages and drawbacks.

If a module is to be assembled on earth and thereafter transported into orbit, then the overall weight and size of the module become limiting factors. The module may be launched and transported from earth into orbit in an existing launch vehicle, in which case the item must come within the weight and size parameters of the existing launch vehicle, or the module may be launched and transported from earth into orbit in a specially designed launch vehicle, in which case a substantial amount of time, money, and manpower is required to design, build, and test the new launch vehicle.

Pre-assembled modules, however, do provide certain advantages. For instance, all of the components and system interfaces of a pre-assembled module may be tested, calibrated, and repaired on the earth surface where replacement parts and technical expertise are readily available. In addition, a pre-assembled module can be utilized almost immediately once in orbit without having to wait for assembly or testing time.

If the space module is to be assembled in orbit, then the number of parts and the method of assembly of the module must be carefully considered. Because assembly in orbit typically requires extravehicular activity (space walks), the assembly of parts in orbit is difficult and highly dangerous for astronauts. Minimizing the number of parts to be assembled as well as the number and extent of astronaut space walks necessary for complete assembly is thus highly desirable.

Like pre-assembled modules, orbit-assembled modules also provide advantages. For example, the size and weight of an orbit-assembled module is theoretically unlimited, thereby providing designers with a greater range of design parameters and possibilities. In addition, the greater volumetric capacity that is possible in an orbit-assembled module provides a more comfortable living area to the astronauts and allows for a broader range of experiments to be conducted within the module.

It would thus be advantageous over the prior art to provide a space module that combines the advantages offered by, and limits some of the drawbacks inherent in, both pre-assembled and orbit-assembled modules.

2. Related Art

Space modules are generally known to the prior art. Illustrative of such modules are U.S. Pat. No. 3,169,725 issued to Berglund on Feb. 16, 1965; U.S. Pat. No. 3,144,219 issued to Schnitzer on Aug. 11, 1964; U.S. Pat. No. 4,730,797 issued to Minovitch on Mar. 15, 1988; U.S. Pat. No. 4,792,108 issued to Bull on Dec. 20, 1988; U.S. Pat. No. 4,825,599 issued to Swann, Jr. on May 2, 1989; U.S. Pat. No. 5,350,138 issued to Culbertson et al. on Sep. 27, 1994; U.S. Pat. No. 5,429,851 issued to Sallee on Jul. 4, 1995; and U.S. Pat. No. 5,580,013 issued to Velke on Dec. 3, 1996.

Although most of the listed patents include ingenious structures to be utilized in the outer space environment and some even include expandable components, none of the inventions disclosed in such patents include a structure that is compact during the launch stage and can thereafter be inflated to provide a fully habitable space in the deployed stage.

SUMMARY OF THE INVENTION

Accordingly, the objectives of this invention are to provide, inter alia, a module to be used in the outer space environment that:

combines the advantages offered by, and limits the drawbacks inherent in, pre-assembled and orbit-assembled modules;

is lightweight, collapsible and compact prior to and during its launch into orbit;

is capable of being subsequently enlarged while in orbit to provide an adequately large volume for human habitation, laboratory work, and space flight;

minimizes the number of parts to be assembled in orbit as well as the number and extent of astronaut space walks necessary to complete the assembly;

may be launched in existing launch vehicles;

allows for the majority of its components and system interfaces to be tested and calibrated on earth prior to launch;

can be efficiently and easily converted from its structurally efficient launch configuration to its deployed configuration;

is inflatable from its launch configuration to its deployed configuration, thereby providing an adequately large volume for human habitation and laboratory work, and utilizes a number of key components for multiple functions thereby providing mass and volume efficiency to the module.

Other objectives of the invention will become apparent from time to time throughout the specification and claims as hereinafter related.

To achieve such objectives, the invention is a module that generally comprises a structural core and an inflatable shell. The inflatable shell is sealingly attached to the structural core. In its launch configuration, the interior and thickness of the inflatable shell are collapsed by vacuum. Also in this configuration, the inflatable shell is efficiently folded around the structural core, and the module is loaded into the payload bay of an existing launch vehicle, such as the Space Shuttle. On location, in orbit for example, the module is deployed, the inflatable shell is inflated, and the module achieves its deployed configuration. In its deployed configuration, the thickness of the inflatable shell automatically expands from its collapsed launch state to its full thickness, and the inflatable shell is inflated around the structural core, defining therein a large volume of habitable space for astronauts. A plurality of removable shelves are arranged interior to the structural core in the launch configuration. The structural core also includes at least one longeron that, in conjunction with the shelves, primarily constitute the rigid, strong, and lightweight load-bearing structure of the module during launch. The removable shelves are detachable from their arrangement in the launch configuration so that, when the module is in its deployed configuration and launch loads no longer exist, the shelves can be rearranged to provide a module interior arrangement suitable for human habitation and work. In the preferred embodiment, to provide efficiency in structural load paths and attachments, the shape of the inflatable shell is a cylinder with semi-toroidal ends in its deployed configuration.

BRIEF DESCRIPTION OF THE DRAWINGS

FIG. 6 is a partial cut-away isometric view of the module with the inflatable shell inflated, including the vertical fairing in its first configuration.

FIG. 7 is a partial cut-away isometric view of the module with the inflatable shell inflated, including the vertical fairing in its second configuration.

FIG. 8 is a partial cut-away isometric view of the module with the inflatable shell inflated, including the horizontal fairing in its second configuration.

FIG. 9 is an isometric view of the structural core, including the horizontal fairing in its first configuration.

FIG. 13 is a partial cut-away elevational view of the module, including the inflated inflatable shell.

FIG. 14 is a cross-sectional view of the sealing attachment between the inflatable shell and the first embodiment of the end rings.

DETAILED DESCRIPTION OF THE INVENTION

Figure 1:
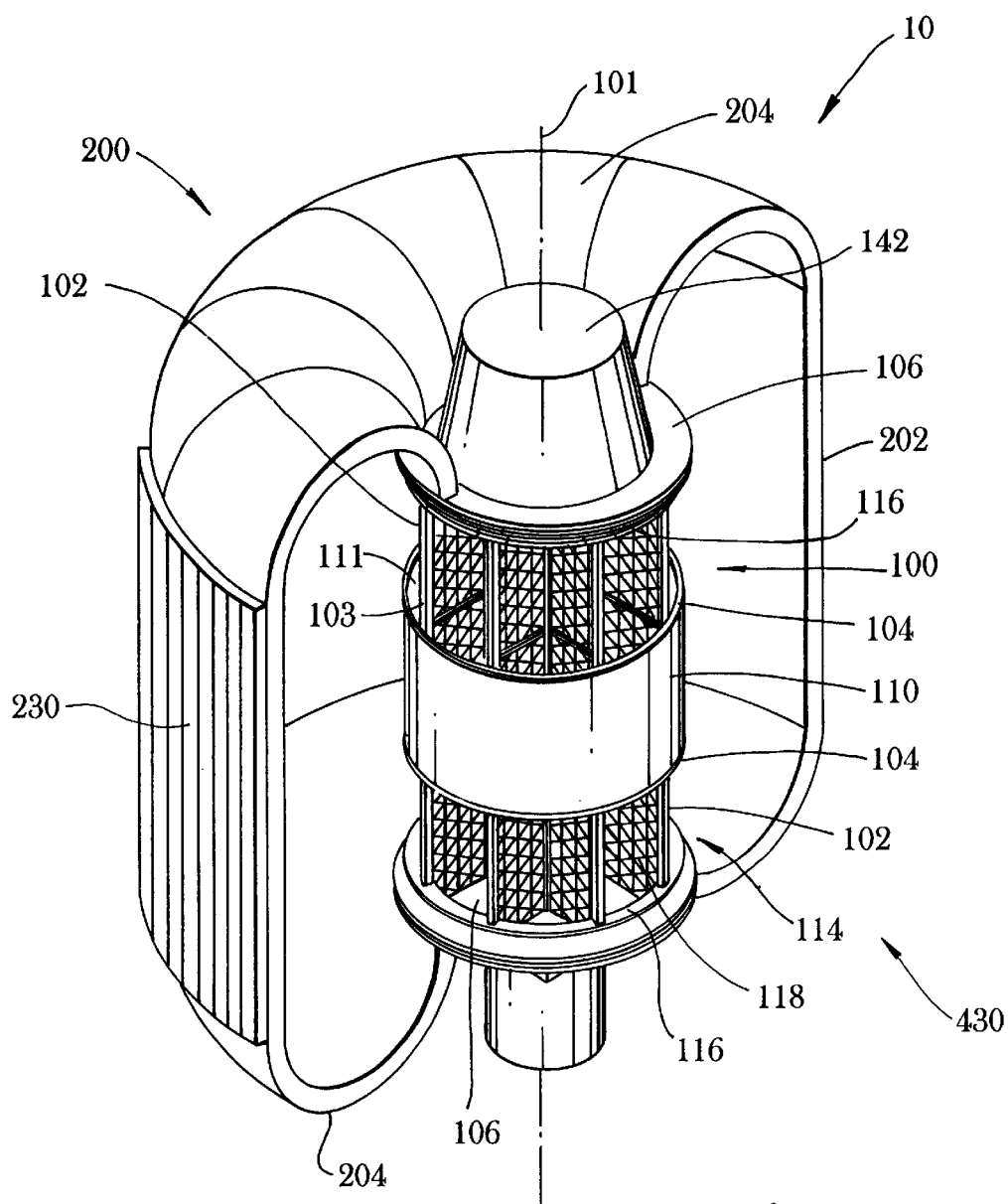
FIG. 1 is a partial cut-away isometric view of the module in the deployed configuration.

The invention is shown in FIGS. 1 through 20 and the Advanced Structural and Inflatable Hybrid Spacecraft Habitation Module is depicted as 10. In general, the module 10 comprises a structural core 100, an inflatable shell 200, and a launch restraint 400 (shown in FIG. 20 only). A carrier 300 is also included in one embodiment of the invention.

The module 10 is intended to provide a large volume, but lightweight, human habitation module particularly suited for long duration space flight. Possible uses for the module 10 include, but are not limited to, a habitation element of an interplanetary vehicle that transports humans between planetary destinations, a habitation or laboratory module on the International Space Station and the like, and a laboratory or habitation module pre-deployed to a planetary or lunar surface.

The module 10 has two basic configurations: a launch configuration 410 (shown in FIGS. 2, 3, and 20) and a deployed configuration 430 (shown in FIGS. 1, 7, and 8). In the launch configuration 410, the thickness or interior of the inflatable shell 200 is collapsed by vacuum, and the inflatable shell is deflated, collapsed, and efficiently folded around the structural core 100. The launch restraint 400 (FIG. 20) maintains the inflatable shell 200 in its collapsed and folded arrangement around the structural core 100. Both the deflated inflatable shell 200 and the structural core 100 are stored within the payload bay of an appropriate launch vehicle, such as the Space Shuttle. In the embodiment which includes carrier 300, module 10 is stored within carrier 300, and carrier 300 is stored within the payload bay.

The launch vehicle then transports the module 10 in its launch configuration 410 from the earth's surface to low earth orbit. Once in orbit, the module 10 is removed from the payload bay (and from the carrier 300 in the relevant embodiment) and may be attached to another vehicle, such as an interplanetary vehicle or space station. The module 10 is then converted from its launch configuration 410 to its deployed configuration 430 by first removing launch restraint 400 from module 10 and allowing inflatable shell 200 to expand around structural core 100. In the deployed configuration 430, the inflatable shell 200 automatically expands and regains its full thickness, and the inflatable shell 200 is inflated to its full volume and surrounds the structural core 100. In the deployed configuration 430, the volume of the module 10 is substantially larger than that of the entire Space Shuttle payload bay.

Structural Core 100

Figure 3:
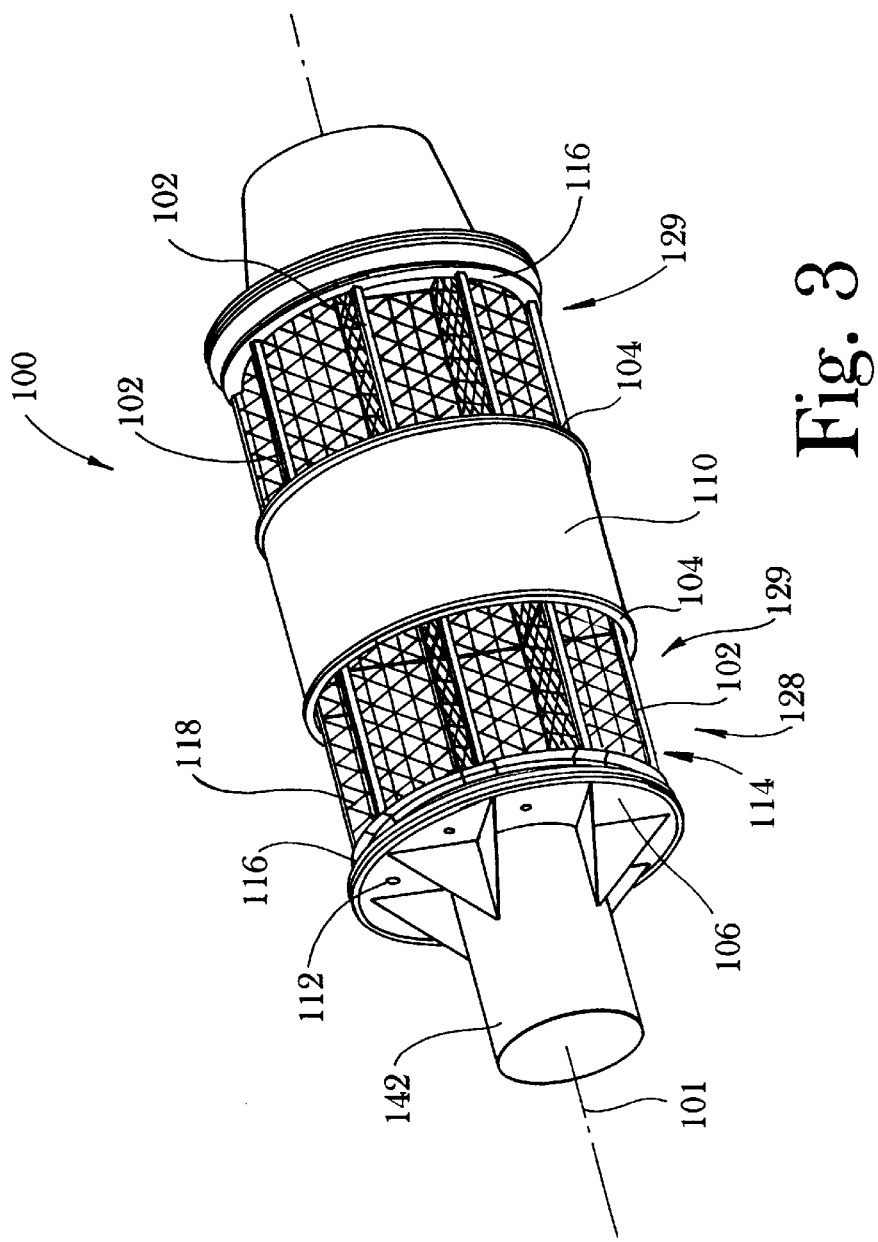
FIG. 3 is an isometric view of the structural core.
Figure 4:
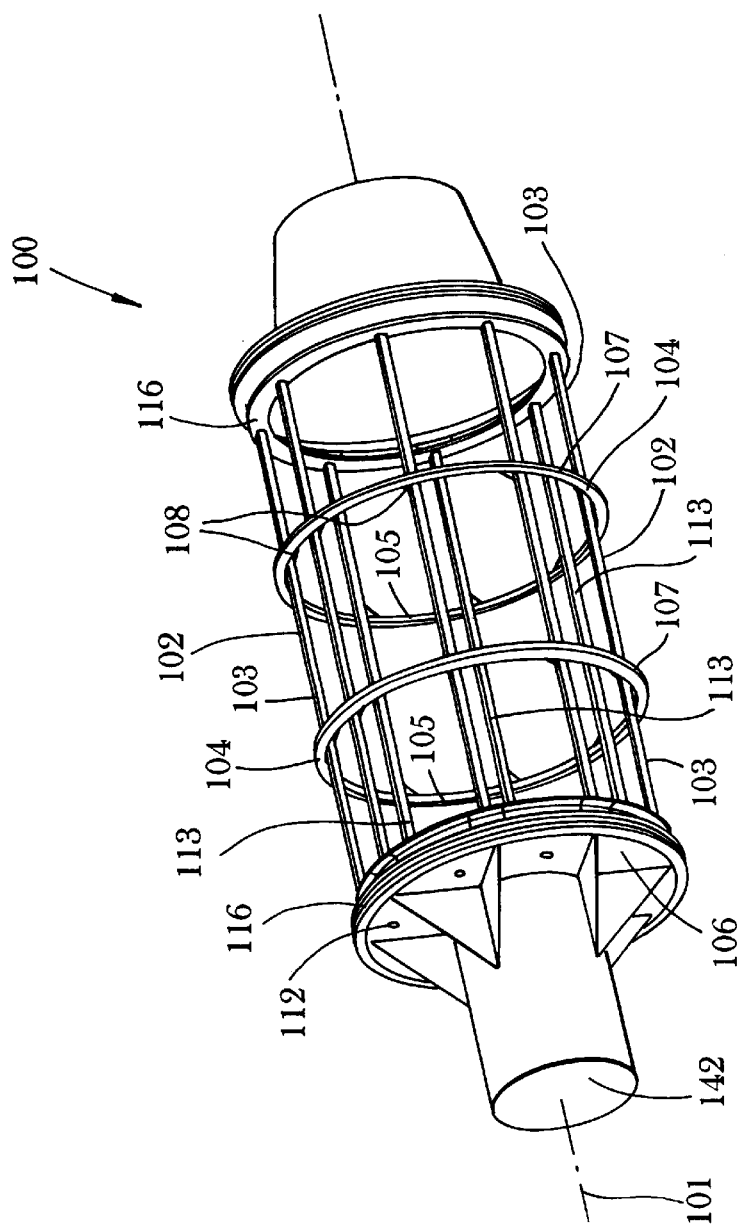
FIG. 4 is an isometric view of the structural core without the shelves included therein.

As best seen in FIGS. 3 and 4, structural core 100 is preferably generally cylindrical in shape and includes a longitudinal axis 101. In addition, structural core 100 is preferably composed of, or preferably includes, at least one longeron 102, at least one body ring 104, two endplates 106, and two end rings 116. The two endplates 106 correspond to the circular ends of the structural core's 100 cylindrical shape. Each longeron 102 extends in a direction parallel to the longitudinal axis 101 of the cylindrical shape and is fixedly attached to one of the two end plates 106. Each body ring 104 is fixedly attached to each longeron 102.

Corresponding to the ends of the structural core's 100 cylindrical shape, each end plate 106 is circular in shape. Each endplate 106 also preferably includes a plurality of hermetically sealed pass through holes 112 extending therethrough. Pass through holes 112 accommodate utility and umbilical conduits enabling easy connection of necessary plumbing, power, data, and other resources from the interior to the exterior of module 10.

Each longeron 102 includes an inner surface 113 proximate the longitudinal axis 101 and an outer surface 103 distal the longitudinal axis 101. In the preferred embodiment, each longeron 102 includes a cross-sectional area having a generally rectangular shape. Also in the preferred embodiment, each longeron 102 extends along the periphery of the structural core's 100 cylindrical shape. In addition, structural core 100 preferably includes a plurality of longerons 102. The longerons 102 extend along the periphery of the cylindrical shape and are spaced apart about the longitudinal axis 101 of the cylindrical shape.

Each body ring 104 includes an inner surface 105 proximate the longtudinal axis 101 and an outer surface 107 distal the longitudinal axis 101. In the preferred embodiment, each body ring 104 includes a cross-sectional area having a generally rectangular shape. Preferably, each body ring 104 surrounds and is attached to each longeron 102 so that the inner surface 105 of each body ring 104 abuts the outer surface 103 of each longeron 102. In the preferred embodiment, each body ring 104 extends in a cross-sectional plane that is parallel to each of the endplates 106. Also in the preferred embodiment, structural core 100 includes one body ring 104 for each buckling mode node on longeron 102 so that each body ring 104 is attached at the corresponding buckling mode node location of each longeron 102.

In addition, each body ring 104 is preferably attached to each longeron 102 by way of a ring bracket 108 (FIG. 4). Ring brackets 108 are constructed of light weight materials, such as aluminum or titanium. In one embodiment (not shown), each body ring 104 is comprised of segments which together make up the ring shape.

Structural core 100 also preferably includes at least one water tank 110. In one preferred embodiment, structural core 100 includes one water tank 110 having a cylindrical shape with an annular cross-section. In this embodiment, water tank 110 extends between two body rings 104 and around each longeron 102 so that the inner surface 111 of water tank 110 abuts the outer surface 103 of each longeron 102. Water tank 110 is, in this embodiment, securely attached to two adjacent body rings 104 and may include multiple independent water reservoirs. In another preferred embodiment (not shown), structural core 100 includes a plurality of arcuate water tanks 110 that aggregately make up the cylindrical shape. In this embodiment, each water tank 110 extends between two body rings 104 and around the corresponding longerons 102 so that the inner surface 111 of each water tank 110 abuts the outer surface 103 of the corresponding longerons 102. It is noted that the enclosing configuration of water tank 110 provides radiation environmental protection to the enclosed area from solar and other radiation activity.

Figure 5:
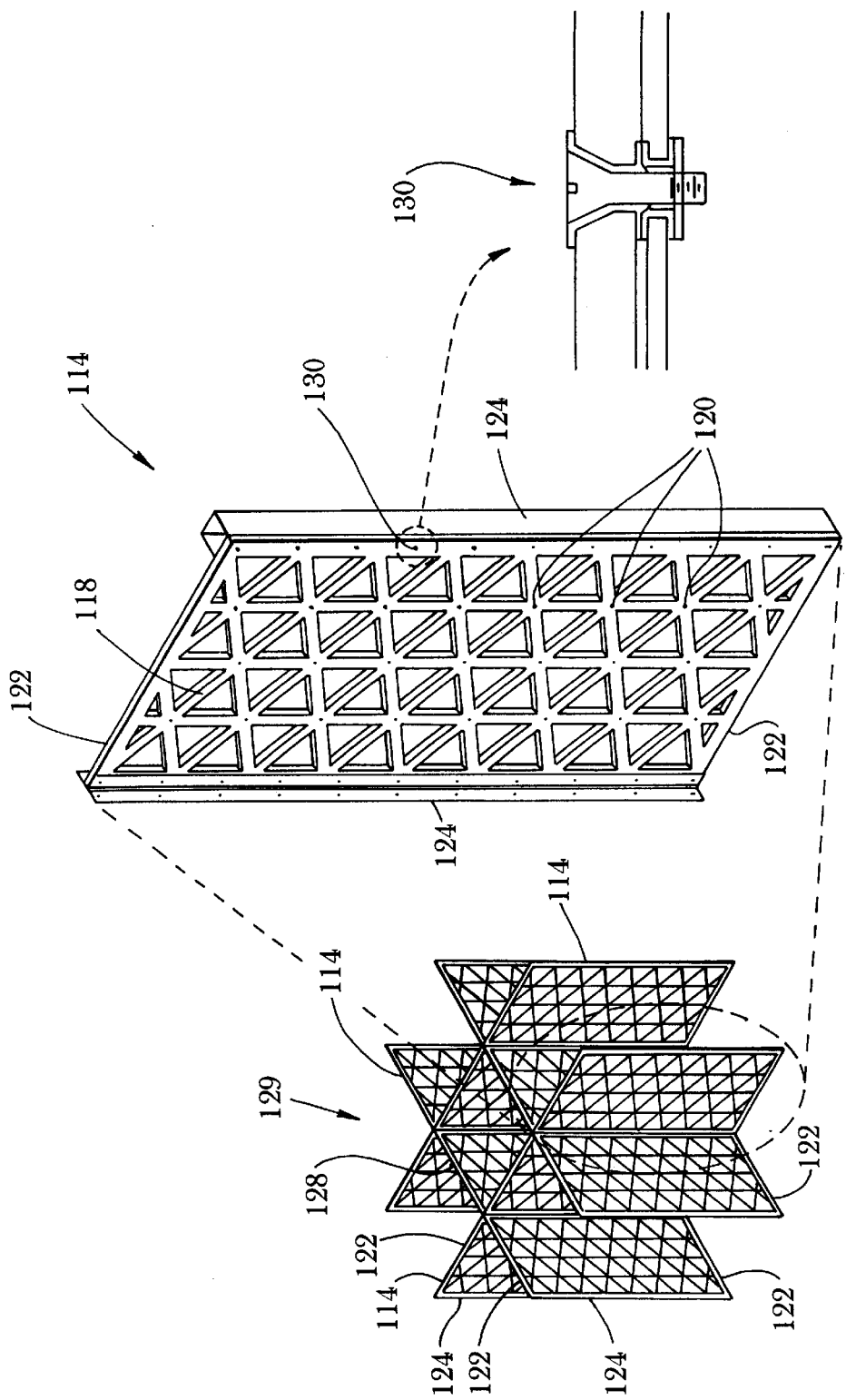
FIG. 5 is an isometric view of the shelves, partially in the cruciform configuration.

Structural core 100 also preferably includes a plurality of removable shelves 114. As illustrated in FIG. 5, each shelf 114 is constructed in the form of an isogrid pattern 118. Each shelf 114 is also preferably constructed from a composite material. In the preferred embodiment, each shelf 114 has a rectangular shape including two opposite first ends 122 and two opposite second ends 124. It is noted that, although each shelf 114 is preferably rectangular in shape, all shelves 114 are not necessarily the same size.

When module 10 is in the launch configuration 410, the shelves 114 are positioned within the cylindrical shape of module 10 interior to the longerons 102, preferably in a cruciform pattern 128 as shown in FIGS. 1, 3, and 5. In the preferred embodiment, the cruciform pattern 128 extends from end plate 106 to end plate 106 and comprises a plurality of cruciform pattern components 129. The cruciform pattern components 129 are stacked one on top of the other, establishing the overall shape of the cruciform pattern. Preferably, cruciform pattern 128 includes a different cruciform pattern component 129 for each distance between an end ring 116 and a body ring 104 and for each distance between two body rings 104.

The shelf-to-shelf attachment of the cruciform pattern 128 and of the cruciform pattern components 129 is enabled by a plurality of shelf-to-shelf attachment means 130 included on the ends, 122 and 124, of each shelf 114. Each shelf-to-shelf attachment means 130 is mateable with all other shelf-to-shelf attachment means 130. Thus, in the cruciform patterns 128 of the launch configuration 410, each of the two opposite first ends 122 and each of the two opposite second ends 124 of each shelf 114 are either attached to one of the two opposite second ends 124 of another shelf 114 (by way of shelf-to-shelf attachment means 130), to one of the two opposite first ends 122 of another shelf 114 (by way of shelf-to-shelf attachment means 130), or to the inner surface 113 of a longeron 102. Therefore, to accommodate the cruciform pattern 128 of the shelves 114 and to maintain the integrity of the structural core 100, each longeron 102 includes a plurality of longeron-to-shelf attachment means (not shown) at its inner surface 113. Each longeron-to-shelf attachment means is mateable with each shelf-to-shelf attachment means 130 of shelves 114.

In the preferred embodiment, the cruciform pattern 128 of shelves 114 extends between the two endplates 106 when module 10 is in the launch configuration 410. In this embodiment, the shelves 114 which are proximate to each end plate 106 are selectively removably attached to such end plate 106. Thus, each end plate 106 must include a plurality of end plate-to-shelf attachment means (not shown) that are mateable with the shelf-to-shelf attachment means 130 of shelves 114.

It is understood that each shelf-to-shelf attachment means 130, longeron-to-shelf attachment means, and end plate-to-shelf attachment means comprises mechanisms that are well known in the art. Such mechanisms may include bolts, screws, and/or snap-tight locking mechanisms. It is also understood that each shelf 114 may include different sets of attachment means, one to attach to other shelves 114 in the cruciform pattern 128 and others to attach to the other elements of the module 10.

Each shelf 114, and its isogrid pattern 118, also includes a plurality of attachment points 120. Preferably, the attachment points 120 are regularly spaced on the nodes of the shelf's 114 isogrid pattern 118. Preferably, the attachment points 120 are mateable with the shelf-to-shelf attachment means 130 of other shelves 114 so that the shelves 114 may be attached to each other in an arrangement other than end, 122 or 124, to end, 122 or 124.

As best seen in FIGS. 2 and 6–9, structural core 100 also includes a fairing 134. In the launch configuration 410, fairing 134 is disposed around the periphery of the cylindrical shape of structural core 100. Fairing 134 includes two embodiments, a horizontal fairing 250 embodiment and a vertical fairing 135 embodiment. For each embodiment, fairing 134 includes two configurations: a first configuration 137 corresponding to the module's 10 launch configuration 410 and a second configuration 139 corresponding to the module's 10 deployed configuration 430.

As shown in FIGS. 8 and 9, horizontal fairing 250 comprises a plurality of struts 256 and a plurality of floor segments 264 (shown in FIG. 8 but not in FIG. 9). Horizontal fairing first configuration 252 is depicted in FIG. 9, while horizontal fairing second configuration 254 is depicted in FIG. 8.

Each strut 256 is elongate in shape and includes a strut first end 258, a strut second end 260, and a strut body 262. Preferably, the cross-sectional area of each strut 256 is generally rectangular. The strut first end 258 of each strut 256 is pivotally attached to the exterior of the structural core 100, preferably to body rings 104. Also preferably, the plurality of struts 256 are equally spaced about each body ring 104. In the preferred embodiment, the struts 256 are attached to the body rings 104 so that each strut 256 is located intermediate two longerons 102.

In the first (launch) configuration 252, each strut 256 is pivoted about strut first end 258 so that its strut body 262 is adjacent to the structural core 100. Preferably, in the first configuration 252, each strut body 262 is parallel to longerons 102. In the second (deployed)configuration 254, each strut 256 is pivoted about its strut first end 258 so that strut body 262 is normal to and strut second end 260 is distal to its corresponding body ring 104. Essentially, in the second configuration 254, each strut 256 extends radially, perpendicular to the longitudinal axis 101. It is noted that the length of each strut 256 is such that, when struts 256 are in the second configuration 254 with module 10 is in its deployed configuration 430, the strut second end 260 of each strut 256 is proximate to inflatable shell 200.

A floor segment 264 is attached to immediately adjacent struts 256 on each body ring 104. Preferably, each floor segment 264 is constructed from a flexible yet sturdy material, such as corrugated graphite-epoxy sheet. It is noted that the material comprising floor segment 264 is flexible in one direction, but is stiff in the other directions. In the first (launch) configuration 252, the flexibility of the floor segment 264 in one direction allows each floor segment 264 to be partially folded onto itself and thereby lie along the periphery of the cylindrical shape between its two corresponding struts 256. In the second (deployed) configuration 254, the stiffness of the floor segments 264 in the other directions allows each floor segment 264 to support weight and serve as flooring in the module 10. Also preferably, the shape of each floor segment 264 is such that each floor segment 264 is taut between its two adjacent struts 256 and is parallel to the strut bodies 262 when struts 256 are in-the second configuration 254 (as shown in FIG. 8).

Each strut 256 also includes a plurality of strut-to-shelf attachment means (not shown). The strut-to-shelf attachment means of struts 256 are mateable to the shelf-to-shelf attachment means 130 of each shelf 114. Thus, the attachment of a shelf 114 to two struts 256 in the same longitudinal plane (with reference to longitudinal axis 101) stabilizes and solidifies the position of such struts 256 in their second configuration 254. Such attachment is shown in FIG. 8.

Vertical fairing 135, in the preferred embodiment, is generally cylindrical in shape and, when positioned in its first configuration 141, completely encloses the heretofore described elements of the structural core 100. Vertical fairing first configuration 141 is depicted in FIG. 6, while vertical fairing second configuration 143 is depicted in FIG. 7.

In the preferred embodiment, vertical fairing 135 comprises a plurality of attached curved fairing segments 138. The plurality of curved fairing segments 138 are attached by any of a variety of well-known means. Also preferably, vertical fairing 135 is constructed from a corrugated material which is able to be bent into the cylindrical shape of vertical fairing 135, but is naturally flat. Thus, when the plurality of curved fairing segments 138 are detached from each other, each fairing segment 138 returns to its natural, unstressed flat disposition.

In the vertical fairing second configuration 143 (FIG. 7), the curved fairing segments 138 have been detached from each other. With module 10 in its deployed configuration 430 and inflatable shell 200 in its fully inflated state, each fairing segment 138 is positioned so that it extends from the outer surface 103 of a longeron 102 to the inflatable shell 200, extending radially perpendicular to the longitudinal axis 101. Thus, for vertical fairing 135, structural core 100 must also include a longeron-to-fairing segment attachment means (not shown) which removably attaches each fairing segment 138 to the corresponding longeron outer surface 103. Preferably, vertical fairing 135, and each fairing segment 138, includes fairing-to-shelf attachment means (not shown) for the shelves 114. Both longeron-to-fairing attachment means and fairing-to-shelf attachment means are well known in the art and may include bolts, screws, and/or snap-tight locking mechanisms.

Figure 10:
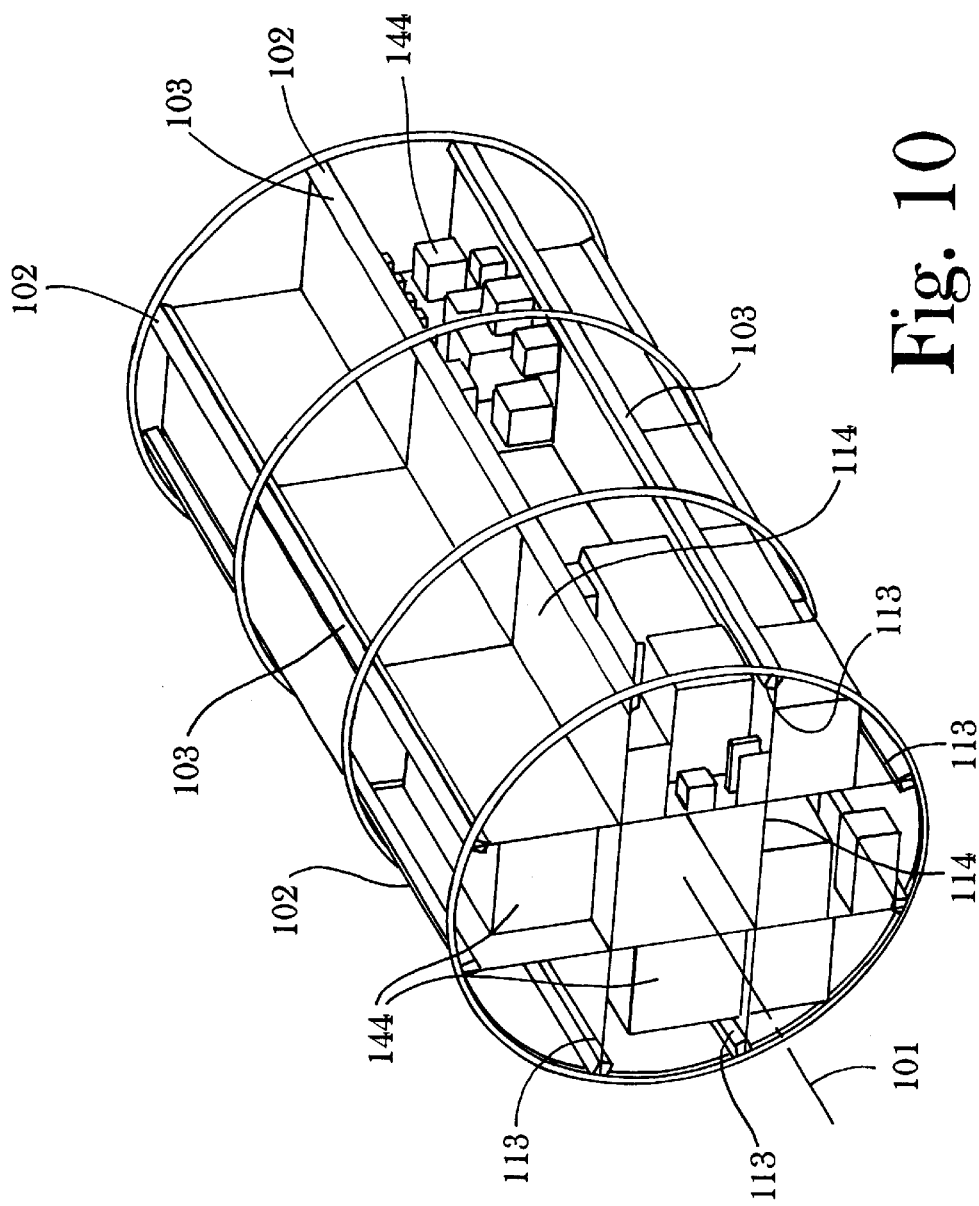
FIG. 10 is an isometric view of the structural core, including the plurality of support system structures.
Figures 11, 12:
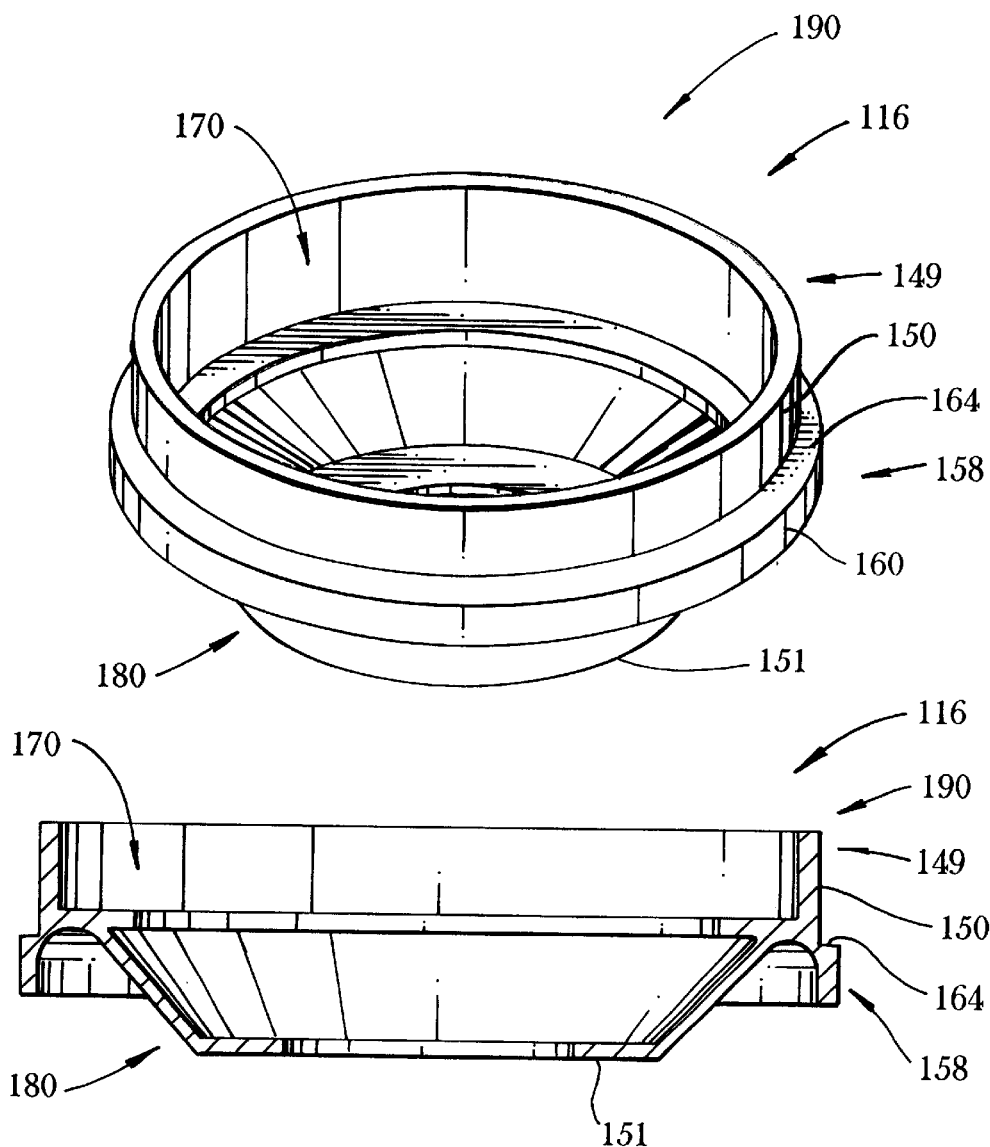
FIG. 11 is an isometric view of the first embodiment of the end rings.
FIG. 12 is a cross-sectional view of the first embodiment of the end rings.

The structural core 100 also includes an airlock 142 (FIG. 6) and a plurality of support system structures 144 (FIG. 10). Airlock 142 is attached to one of the two endplates 106 and can be accessed through such endplate 106 from within the structural core 100. The relevant end plate 106 thus includes an airlock opening (not shown). Preferably, support system structures 144, as best seen in FIG. 10, are pre-attached to specific shelves 114 so that each structure 144 need not be detached from its corresponding shelf 114 once module 10 is in the deployed configuration 430. Thus, if need be, each shelf 114, including any structure 144 attached thereto, is moved from its position in the cruciform pattern 128 of the launch configuration 410 to its end position in the deployed configuration 430. One of the module structures 144 structurally supports a life support system which is integrated into the structural core 100 and is regenerative, featuring one hundred percent reuse of air and water. In the preferred embodiment, the water tank(s) 110 constitute a part of such regenerative life support system.

Figure 15:
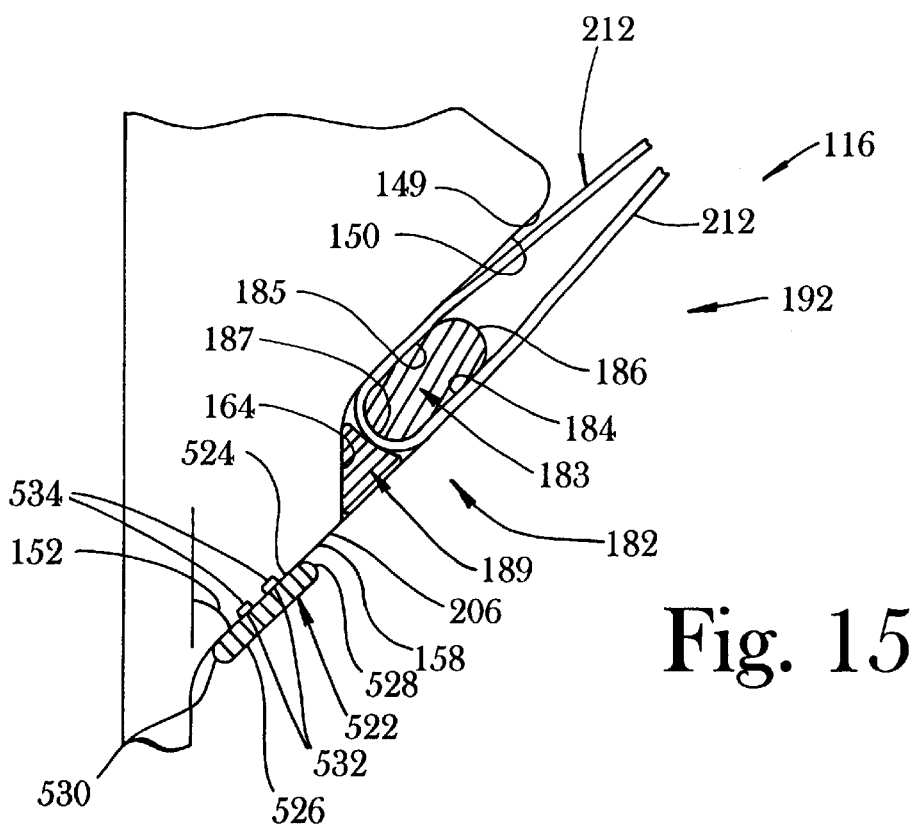
FIG. 15 is a cross-sectional view of the sealing attachment between the inflatable shell and the second embodiment of the end rings.

The two end rings 116 have two alternative preferred embodiments, a first embodiment 190 (shown in FIGS. 11, 12, and 14) and a second embodiment 192 (shown in FIG. 15). In both embodiments, 190 and 192, each end ring 116 includes an outer surface 150 distal to the longitudinal axis 101. End ring outer surface 150 includes a primary end ring area 149, a secondary end ring area 158, and a shoulder end ring area 164. Generally, primary end ring area 149 is proximate while secondary end ring area 158 is distal the end ring's 116 corresponding endplate 106. Shoulder end ring area 164 is intermediate primary end ring area 149 and secondary end ring area 158.

In the first alternative preferred embodiment 190 (FIGS. 12, 13), primary end ring area 149 and secondary end ring area 158 are both concentric with the longitudinal axis 101 of the structural core's 100 cylindrical shape. Shoulder end ring area 164, in the first embodiment 190, is perpendicular to the longitudinal axis 101, the primary end ring area 149, and the secondary end ring area 158. In the preferred embodiment, the diameter of end ring 116 at primary end ring area 149 is smaller than the diameter of end ring 116 at secondary end ring area 158.

In the second alternative preferred embodiment 192 (FIG. 15), primary end ring area 149 and secondary end ring area 158 extend at conic half angle 152 in relation to the longitudinal axis 101 so that the diameter of end ring 116 increases from secondary end ring area 158 to primary end ring area 149. Shoulder end ring area 164, in this second embodiment 192, is generally concentric with the longitudinal axis 101.

In both the first and second alternative preferred embodiments, 190 and 192, each end ring 116 also preferably includes a primary shoulder 170 and a secondary shoulder 180. Both primary shoulder 170 and secondary shoulder 180 extend radially inward in relation to the longitudinal axis 101 of the structural core's 100 cylindrical shape.

In addition, in both embodiments, 190 and 192, each of the two end rings 116 is concentrically and fixedly attached to one of the two end plates 106 at or adjacent to the primary end ring area 149. In another embodiment, each end ring 116 and its corresponding end plate 106 comprise one integral element.

Each of the two end rings 116 also includes a lower surface 151. Each of the two end rings 116 is fixedly attached, by means well known in the art such as welding or bolting, at its end ring lower surface 151 to an end of each longeron 102. Thus, each longeron 102 extends from the end ring lower surface 151 of one of the two end rings 116 to the end ring lower surface 151 of the other end ring 116.

Inflatable Shell 200

Figure 20:
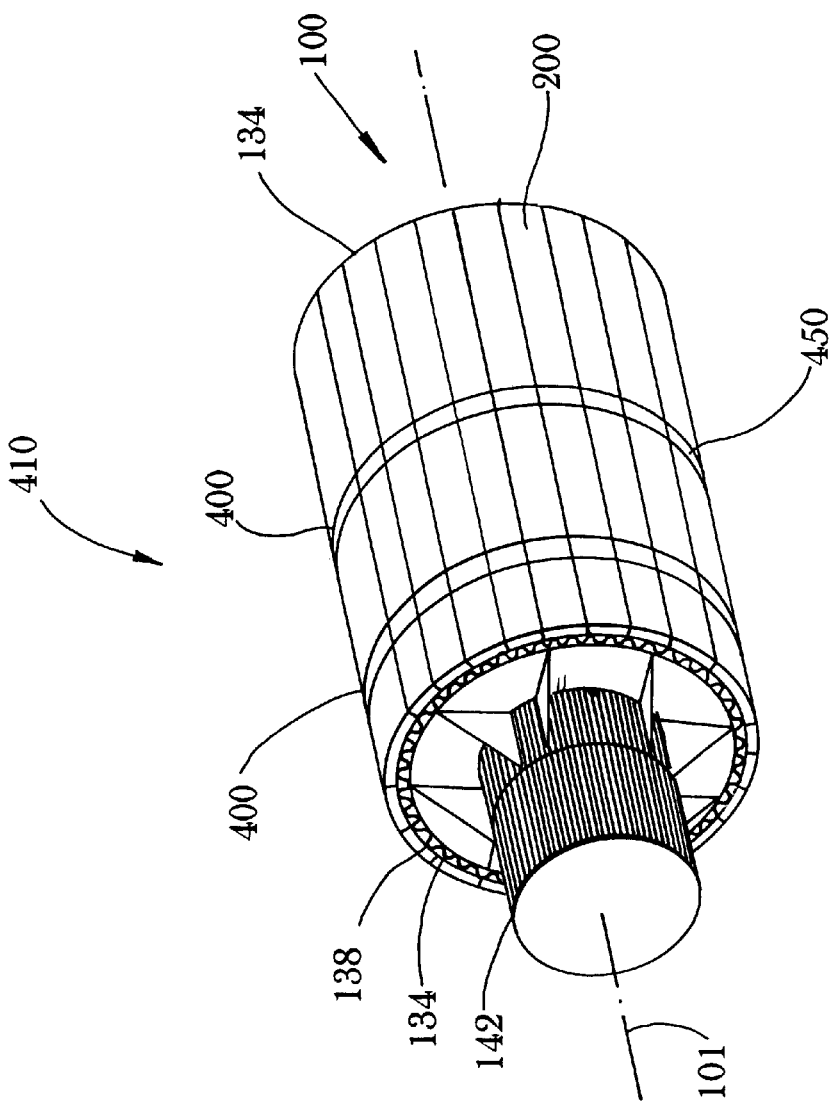
FIG. 20 is an isometric view of the inflatable shell folded around the structural core.

Inflatable shell 200 is a multi-layer construction of soft goods that can be folded around the structural core 100 for efficient packaging in the launch configuration 410 and then inflated into the deployed configuration 430. In the launch configuration 410, as best seen in FIG. 20, the thickness or interior of inflatable shell 200 is collapsed by vacuum, and the inflatable shell 200 as a whole is deflated, collapsed, and efficiently folded around the structural core 100. In particular, inflatable shell 200 is deflated and is collapsed and efficiently folded around the fairing 134. The launch restraint 400 maintains the inflatable shell 200 in its collapsed and folded arrangement around the structural core 100 or fairing 134. Once fully inflated into the deployed configuration 430, as seen in FIG. 1, the shape of the inflatable shell 200 is preferably a circular cylinder 202 with semi-toroidal ends 204. The semi-toroidal ends 204 are maintained in their proper shape by the cloth pattern geometry and by the tension provided by the longerons 102.

Figure 17:
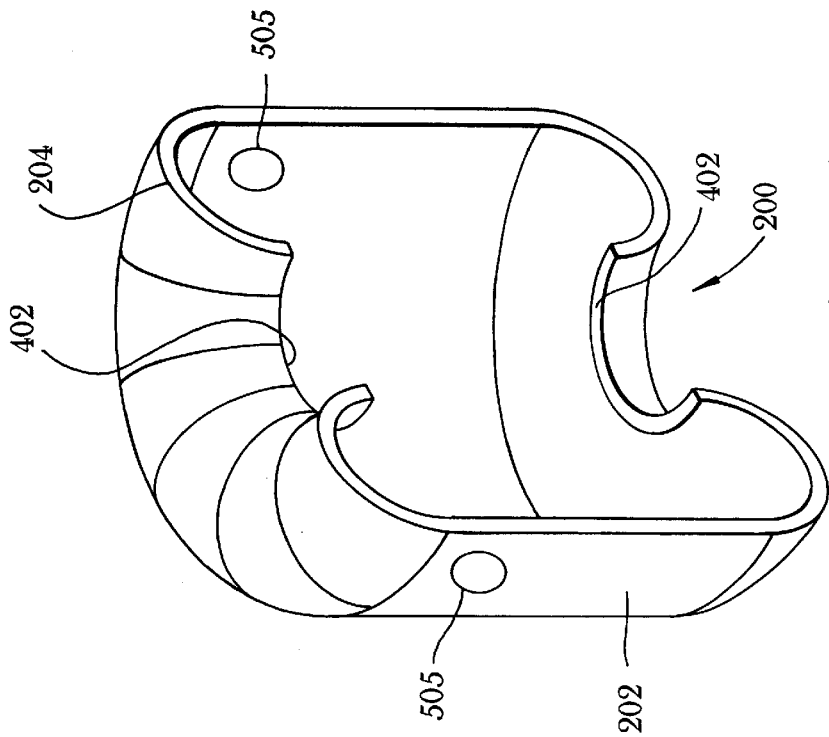
FIG. 17 is an isometric view of half of the inflatable shell.
Figure 18:
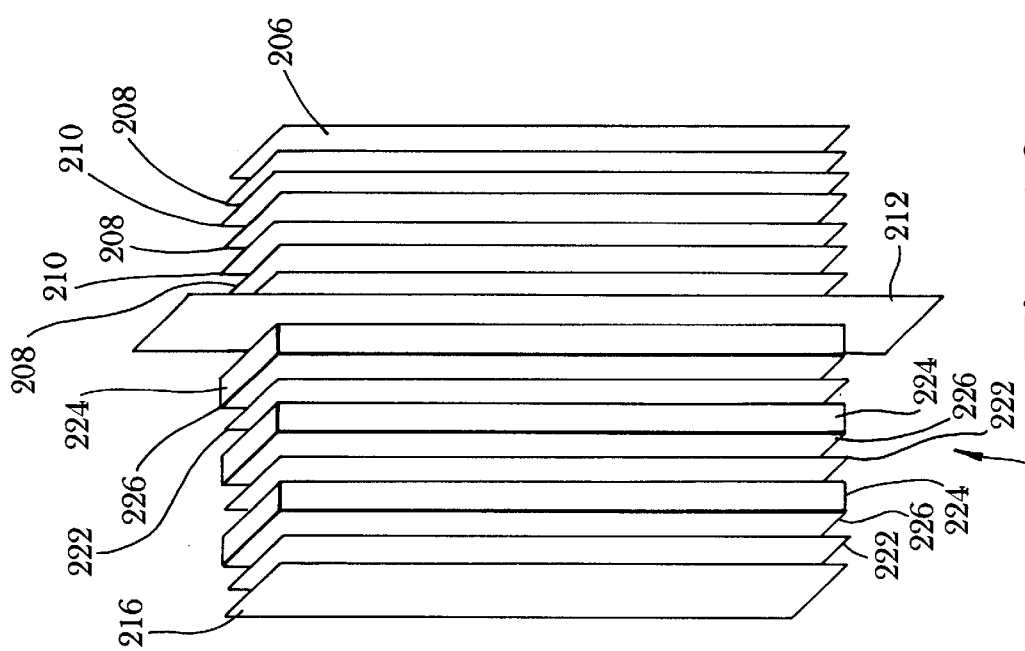
FIG. 18 is an exploded view of the layers comprising the inflatable shell.

As shown in FIGS. 17 and 18, in general and from inside to outside, inflatable shell 200 comprises the following layers: an inner liner 206, a plurality of alternating layers of bladders 208 and bleeder cloths 210, a structural restraint 212, a meteoroid orbital debris (M/OD) shield assembly 214, and an outer liner 216. Further, the inflatable shell 200 includes a plurality of shape rings 218 interior to inner liner 206 secured in place once the inflatable shell 200 is fully inflated into the deployed configuration 430.

Inner liner 206 corresponds to the "inside" wall of inflatable shell 200 and provides damage protection to the plurality of bladders 208 should accidents occur within the module 10. Preferably, inner liner 206 is nonflammable, thereby restricting any fire to the interior of module 10.

Inner liner 206 also facilitates the attachment of the plurality of shape rings 218, as best seen in FIG. 6. Preferably, each shape ring 218 is inflatable and has a circular toroidal shape. The toroidal outer diameter 219 of each shape ring 218 is sized slightly larger than the cross-sectional diameter of inner liner 206 when inflatable shell 200 is in its deployed configuration 430. As a result, once inflated, each shape ring 218 abuts inner liner 206 maintaining a contact force radially outward on the multiple layers of the inflatable shell 200. For each shape ring 218, a hook and pile attachment system 220 is provided on inner liner 206 and shape ring 218 to restrict the movement and maintain the contact of the shape ring 218 in relation to inner liner 206.

Turning back to FIG. 18, the plurality of bladders 208 provide the redundant primary gas containment mechanism for the inflatable shell 200. The bladders 208 are sealed together to create a thicker single bladder 211 just before approaching the inner circumference 402 of the semi-toroidal ends 204. A flexible boot 209, shown in FIG. 14, provides a smooth transition between the redundant bladders 208 and the structural restraint 212 just prior to the location where the redundant bladders 208 are sealed together. In the preferred embodiment, the bladders 208 are each designed to be geometrically slightly larger in size than the structural restraint 212.

A bleeder cloth, 210 is disposed between each consecutive pair of bladders 208. In the preferred embodiment, each bleeder cloth 210 is constructed from a light weight, porous, felt-like material. Among other functions, the bleeder cloths 210 prevent contact between bladders 208 thereby eliminating the threat of abrasion and film blocking and providing a cavity between each bladder 208. Thus, by providing a cavity between adjoining bladders 208, bleeder cloths 210 allow the pressure and integrity of each individual bladder 208 to be monitored and aid in the identification and location of bladder 208 leaks. Furthermore, because bleeder cloths 210 are porous, they enable the equalization of pressure within each cavity. In addition, one or more bleeder cloth 210 cavities can be mechanically evacuated (and still monitored) so that the lost gas from a bladder 208 interior leak can be recaptured and pumped back into the interior of the module 10 resulting in very low gas leak rates. During this evacuation process, the porous bleeder cloth 210 acts to prevent areas of gas entrapment (pinch off) between the bladders 208 and maintains a free gas flow path within each cavity. Other bleeder cloth 210 cavities can be filled with fluids that provide added radiation protection and/or aid in leak detection, location, and self sealing. In this scenario, bleeder cloth 210 acts to wick the contained fluid to ensure even fluid distribution within the corresponding cavity.

Structural restraint 212 is constructed from a high performance "soft goods" material that exhibits high strength and stiffness characteristics, such as Kevlar® or Vectran®. Structural restraint 212 is the primary structure of inflatable shell 200. Structural restraint 212 also serves to separate the inner layers (inner liner 206, bladders 208, and bleeder cloths 210) from the outer layers (M/OD shield assembly 214 and outer liner 216) of the inflatable shell 200.

As shown in FIG. 18, M/OD shield assembly 214 is composed of a plurality of bumper layers 222, a plurality of spacing layers 224, and adhesive 226. Bumper layers 222 act to shock, fragment, and vaporize incoming M/OD particles. Because extreme heat energy is generated in the resulting particle vapor cloud, each bumper layer 222 preferably includes a thin coating of an ablative energy absorbing adhesive 226, such as RTV silicone. Adhesive 226 also acts as an ablator for added M/OD shield assembly 214 performance. Consecutive bumper layers 222 are separated by a spacing layer 224. In the preferred embodiment, each spacing layer 224 is composed of light weight, open cell foam which can be cored out by intermittently cutting out material to achieve a still lighter weight. Each spacing layer 224 additionally includes gaps 228, as best seen in FIG. 19, specifically located to create hinge lines on inflatable shell 200 thereby enabling the folding of inflatable shell 200 for the launch configuration 410.

Each spacing layer 224 is thick enough to provide sufficient stand-off spacing between the other M/OD shield assembly 214 components. In addition, each spacing layer 224 (which comprises open cell foam in the preferred embodiment) enables the thickness or interior of inflatable shell 200 to be collapsed or shrunk by vacuum evacuation in order to aid in efficient folding and packaging. Thereafter, when it is exposed to the hard vacuum of space, the spacing layer 224 (which comprises open cell foam in the preferred embodiment) will naturally return to its original thickness providing the correct stand-off distance required for the M/OD shield assembly 214 components. Finally, the spacing layer 224 enables the M/OD shield assembly 214 to provide increased passive thermal control to the module 10. By having the wall thickness exposed to the vacuum of space, the spacing layer 224 becomes a good thermal insulator. In addition, since there is no fluid surrounding it, the spacing layer 224 cannot transmit heat through convection. Therefore, the only heat transfer method through inflatable shell 200 is radiation. Lastly, because the relatively thick spacing layer 224 provides a large cumulative thickness to the M/OD shield assembly 214, the spacing layer 224 also acts to provide shape retention to module 10 in the event of module 10 depressurization.

Figure 19:
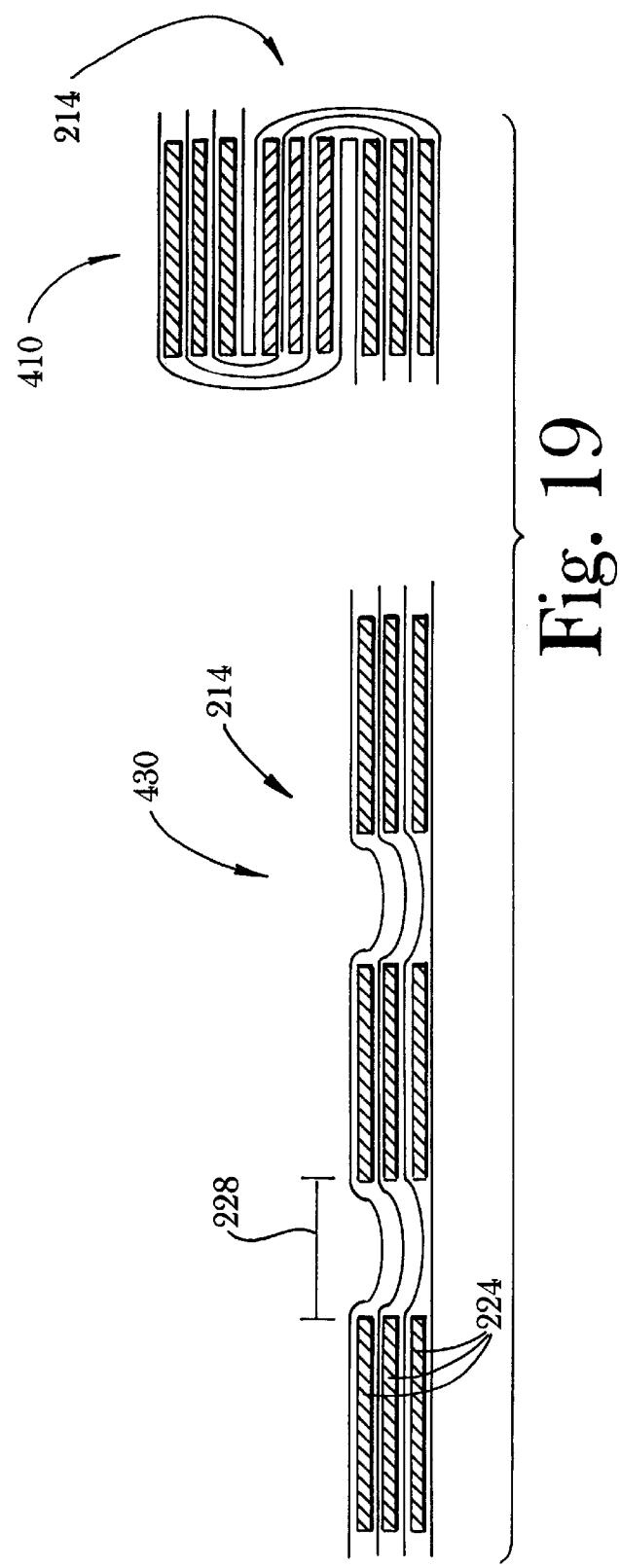
FIG. 19 is a cross-sectional view of the arrangement of the inflatable shell in the launch and deployed configurations.

The preferred folding pattern of inflatable shell 200 for the launch configuration 410 is illustrated in FIG. 19, including gaps 228 and open cell foam 224. The same pattern in the non-folded deployed configuration 430 is also shown in FIG. 19.

Outer liner 216 comprises a lightweight multi-layer insulating blanket that contains suitable radiation properties for primary passive thermal control. In addition, outer liner 216 provides an impermeable membrane to enable the vacuum compaction of the plurality of spacing layers 224 prior to folding and packaging.

In the preferred embodiment, a radiator 230, partially shown in FIG. 1, is selectively attached to the exterior of the inflatable shell 200. Thus, the inflatable shell 200, particularly the outer liner 216 of the inflatable shell 200, is constructed to enable such selective attachment Preferably, the radiator 230 is flexible and is designed to be folded along with the inflatable shell 200. In another embodiment, the radiator 230 is attached separately after the inflation of the inflatable shell 200.

Connection of Structural Core 100 to Inflatable Shell 200

The inflatable shell 200 is sealingly attached to the structural core 100 at each end ring 116. As previously disclosed, the shape of inflatable shell 200 is semi-toroidal at each end. Each semi-toroidal end 204 includes an inner circumference 402. The inner circumference 402 of each semi-toroidal end 204 is sealingly attached to the corresponding end ring 116 of structural core 100. The arrangement of the sealing attachment between inner circumference 402 and end ring 116 depends on whether the first or second embodiment, 190 or 192, of end ring 116 is utilized.

As shown in FIG. 14, in the first embodiment 190 of end ring 116, at the inner circumference 402 of each semi-toroidal end 204, the structural restraint 212 of multi-layered inflatable shell 200 ends in a deadman 404. Deadman 404 has a thickness that is substantially larger than the thickness of the remainder of structural layer 212. Preferably, deadman 404 has a bulbous shape 406.

Deadman 404 is attached to the corresponding end ring 116 by way of a deadman retainer 408. Deadman retainer 408 is ring shaped and includes an outer surface 412, an inner surface 410, a top surface 414, and a bottom surface 416. Preferably, deadman retainer 408 has a generally rectangular cross-sectional area Deadman retainer outer surface 412 is distal the longitudinal axis 101 of the structural core's 100 cylindrical shape while deadman retainer inner surface 410 is interior of the outer surface 412.

The diameter of deadman retainer 408 at the deadman retainer inner surface 410 is substantially equal to the diameter of primary end ring area 149. Thus, deadman retainer inner surface 410 and primary end ring area 149 abut each other along their respective circumferences. Also preferably, deadman retainer bottom surface 416 abuts shoulder end ring area 164. In addition, the diameter of deadman retainer 408 at the deadman retainer outer surface 412 is preferably substantially equal to the diameter of secondary end ring area 158.

Deadman 404 is retained between deadman retainer inner surface 410 and primary end ring area 149. To enable such retainment, deadman retainer inner surface 410 and primary end ring area 149 include opposing grooves 418 which, when placed in opposing abutment, are sized and constructed to securely hold deadman 404 therein.

Preferably, from deadman retainer groove 418, deadman retainer inner surface 410 is gradually tapered away from end ring 116 towards deadman retainer top surface 414. This taper facilitates the placement of structural restraint 212 therebetween.

Deadman retainer 408 is securely attached to primary ring component 149 by way of a plurality of deadman retainer bolts 420. Such type of attachment is widely known in the art. Preferably, sets of two deadman retainer bolts 420 are equally spaced about the circumference of deadman retainer 408. For each set of two deadman retainer bolts 420, the two deadman retainer bolts 420 are attached on the same longitudinal cross-sectional plane, one on either side of the opposing grooves 410.

In this end ring first embodiment 190, the inner liner 206 and the plurality of bladders 208 of inflatable shell 200 are also sealingly attached to each end ring 116 at the inner circumference 402 of each semi-toroidal end 204. Specifically, the inner liner 206 is constrained between the secondary end ring area 158 of each end ring 116 and a seal ring 422. Inner liner 206 is thus preferably longer than structural restraint 212. Each seal ring 422 is attached to its corresponding end ring 116 at the secondary end ring area 158 by means of attachment well-known in the art, such as bolting similar to that of deadman retainer 408. As previously disclosed, the plurality of bladders 208 are sealed together to create a thicker single bladder 211 just before approaching the inner circumference 402. The thicker single bladder 211 is also sealingly constrained between the secondary end ring area 158 of each end ring 116 and seal ring 422, and is thus also preferably longer than structural restraint 212.

Seal ring 422 includes an inner surface 424, an outer surface 426, a top surface 428, and a bottom surface 430. Preferably, seal ring 422 has a generally rectangular cross-sectional area. Seal ring outer surface 426 is distal while seal ring inner surface 424 is proximate the longitudinal axis 101 of the structural core's 100 cylindrical shape.

The diameter of seal ring 422 at the seal ring inner surface 424 is substantially equal to the diameter of secondary end ring area 158. Thus, seal ring inner surface 424 and secondary end ring area 158 abut each other throughout their respective circumferences and securely retain a portion of inner liner 206 and a portion of the thicker single bladder 211 therebetween.

Two annular seals 432 are disposed between seal ring inner surface 424 and secondary end ring area 158 in order to provide a sealing engagement to such abutment. To accommodate annular seals 432 therebetween, secondary end ring area 158 is provided with two annular seal grooves 434, each sized and constructed to hold an annular seal 432 therein.

As previously disclosed (FIG. 14), inflatable shell 200 comprises a flexible boot 209 which provides a smooth transition between bladders 208 and structural restraint 212.

Flexible boot 209 is disposed and constricted between the inside of structural restraint 212, deadman retainer top surface 414, and the outside of the outermost bladder 208.

Figure 16:
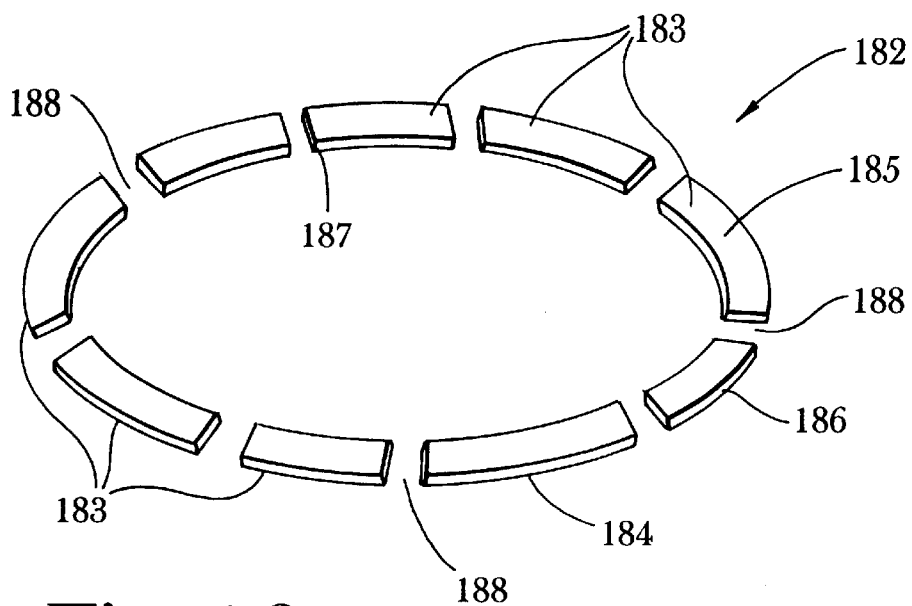
FIG. 16 is an isometric view of one embodiment of the attachment ring.

As shown in FIG. 15, in the second embodiment 192 of end ring 116, the structural restraint 212 includes an attachment ring 182 at the inner circumference 402 of each semi-toroidal end 204. In one embodiment, attachment ring 182 comprises one solid piece. In another embodiment, as shown in FIG. 16, attachment ring 182 is comprised of a plurality of ring segments 183 with gaps therebetween. Attachment ring 182 (and each ring segment 183 in the relevant embodiment) has a thickness that is substantially larger than the thickness of the remainder of structural layer 212. Also preferably, attachment ring 182 (and each ring segment 183 in the relevant embodiment) is fixedly connected to the structural restraint 212 at the inner circumference 402 of each semi-toroidal end 204 by means well-known in the art, such as by folding and stitching the structural restraint 212 around the attachment ring 182 (or each ring segment 183 in the relevant embodiment).

Attachment ring 182 includes an outer surface 184, an inner surface 185, a top surface 186, and a bottom surface 187. Attachment ring outer surface 184 is distal while attachment ring inner surface 185 is proximate the longitudinal axis 101 of the structural core's 100 cylindrical shape. In the preferred embodiment, attachment ring inner surface 185 is concentric with primary end ring area 149 and secondary end ring area 158. In the embodiment including ring segments 183 each ring segment 183 includes an outer surface 184, an inner surface 185, a top surface 186, and a bottom surface 187.

Attached to structural restraint 212 as previously disclosed, each attachment ring 182 is fixedly connected, by means well-known in the art such as bolting, to one of the end rings 116. in the embodiment including ring segments 183, each ring segment 183 is fixedly connected to one of the end rings 116. In the embodiment including solid attachment ring 182, attachment ring 182 is positioned on end ring 116 so that inner surface 185 abuts primary end ring area 149 along their respective circumferences. In the embodiment including ring segments 183, the complete inner surface 185 of each ring segment 183 abuts a corresponding portion of primary end ring area 149 with ring segment gaps 188 spacing the ring segments 183 from each other along the entire circumference of primary end ring area 149.

In this end ring second embodiment 192, the inner liner 206 and the plurality of bladders 208 of inflatable shell 200 are also sealingly attached to each end ring 116 at the inner circumference 402 of each semi-toroidal end 204. Specifically, the inner liner 206 is constrained between the secondary end ring area 158 of each end ring 116 and a seal ring 522. Inner liner 206 is thus preferably longer than structural restraint 212. Each seal ring 522 is attached to its corresponding end ring 116 at the secondary end ring area 158 by means of attachment well-known in the art, such as bolting similar to that of deadman retainer 408. Also in this embodiment, the thicker single bladder 211 is also sealingly constrained between the secondary end ring area 158 of each end ring 116 and seal ring 422, and is thus also preferably longer than structural restraint 212.

Seal ring 522 includes an inner surface 524, an outer surface 526, a top surface 528, and a bottom surface 530. Preferably, seal ring 522 has a generally rectangular cross-sectional area. Seal ring outer surface 526 is distal while seal ring inner surface 524 is proximate the longitudinal axis 101 of the structural core's 100 cylindrical shape. In this embodiment, seal ring inner surface 524 is concentric with secondary end ring area 158.

In addition, the diameter of seal ring 522 at the seal ring inner surface 524 is substantially equal to the diameter of secondary end ring area 158. Thus, seal ring inner surface 524 and secondary end ring area 158 abut each other throughout their respective circumferences and securely retain a portion of inner liner 206 therebetween.

Two annular seals 532 are disposed between seal ring inner surface 524 and secondary end ring area 158 in order to provide a sealing engagement to such abutment. To accommodate annular seals 532 therebetween, secondary end ring area 158 is provided with two annular seal grooves 534, each sized and constructed to hold an annular seal 532 therein.

A ring clip 189 is disposed in the area defined by inner liner 206, shoulder end ring area 164, and split ring bottom surface 187. Preferably, ring clip 189 and split ring 182 are sized and constructed so that inner liner 206 and thicker single bladder 211 form a smooth tangential surface from secondary end ring area 158.

Inflatable shell 200 may also include a plurality of view windows 505, as shown in FIG. 17. View windows 505 are sealingly attached to the layers of inflatable shell 200 in a manner similar to the attachment between inflatable shell 200 and end ring 116, as detailed herein.

Launch Restraint 400

The launch restraint 400, generally shown in FIG. 20, maintains the inflatable shell 200 in its collapsed and folded arrangement around the structural core 100 when module 10 is in the launch configuration 410. Launch Restraint 400 must be easily releasable so that an astronaut may readily detach the restraint 400 once module 10 is set to be converted into its deployed configuration 430. In a preferred embodiment, restraint 400 comprises a zip cord mechanism 450 which is released by a simple pulling motion and which once activated unwinds, by itself, from around inflatable shell 200.

Carrier 300

Figure 2:
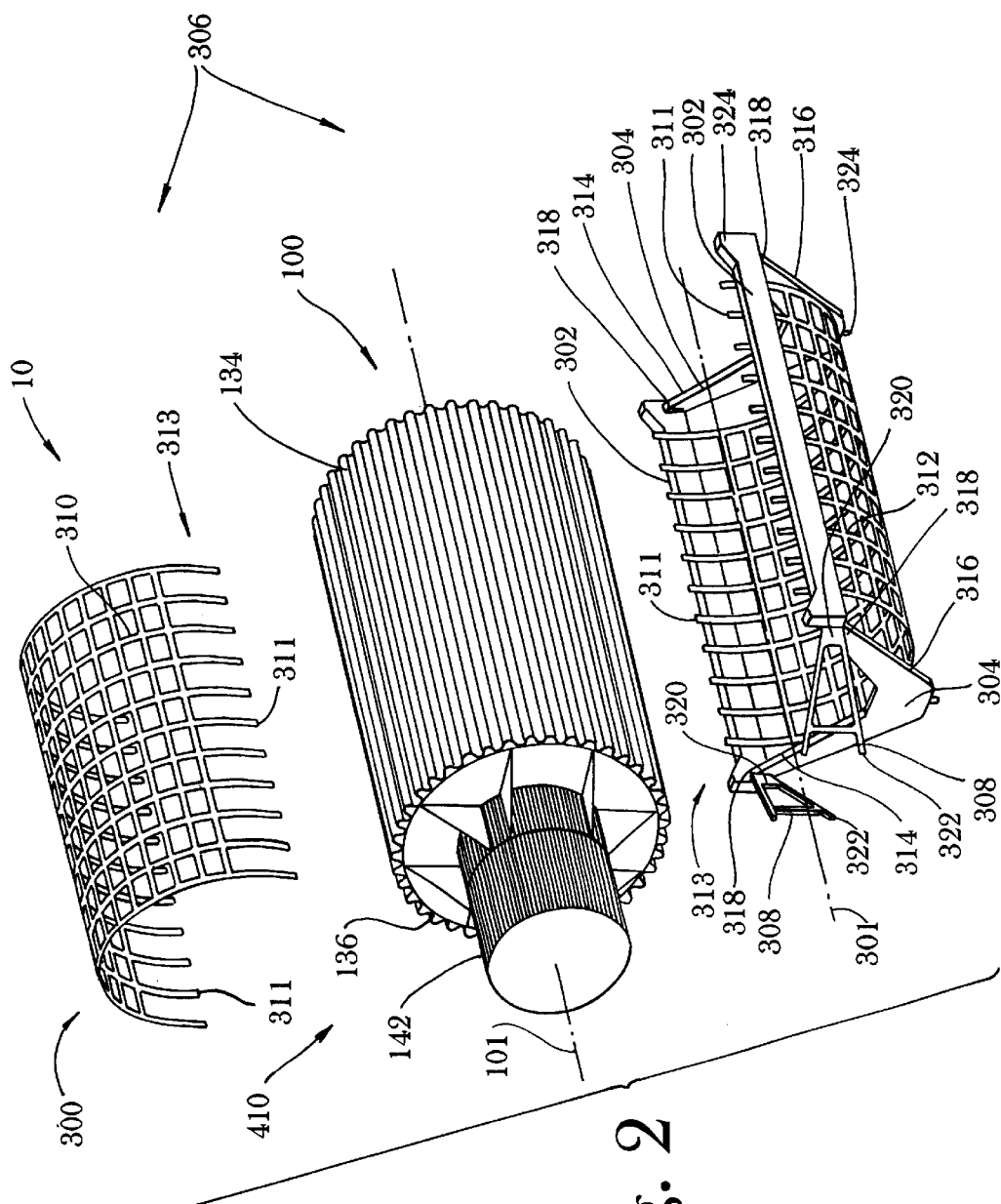
FIG. 2 is an isometric view of the module in the launch configuration, including the carrier.

As shown in FIG. 2, in the embodiment including carrier 300, module 10 is stored within a carrier 300 during its flight within the launch vehicle's payload bay. Carrier 300 provides a lightweight mechanism to transport the structural core 100 and inflatable shell 200 (in the launch configuration 410) into space onboard existing launch vehicles, such as the Space Shuttle. While providing such transportation, carrier 300 also isolates the structural core 100 from the large bending loads generated during the launch and ascent of the launch vehicle. In general, carrier 300 comprises at least two side beams 302, two end frames 304, a carrier webbing 306, and two thrust frames 308.

Carrier 300 preferably has the same general cylindrical shape of structural core 100 and inflatable shell 200, including a longitudinal axis 301.

Carrier webbing 306 provides the perimeter outline of the cylindrical shape. Preferably, carrier webbing 306 comprises a first carrier webbing section 310 and a second carrier webbing section 312, each having a semi-cylindrical shape. First carrier webbing section 310 and second carrier webbing section 312 are selectively attached at their free ends 311 by way of webbing section attachment means 313. The attachment of first carrier webbing section 310 to second carrier webbing section 312 at their free ends 311 thus produces the generally cylindrical shape of carrier 300.

At least two side beams 302 are attached to either one of the carrier webbing sections, 310 and 312. Each side beam 302 extends in the direction parallel to the longitudinal axis 301 of the carrier's 300 cylindrical shape. Preferably, a side beam 302 is attached adjacent each free end 311 of the corresponding carrier webbing section, 310 or 312. Also preferably, each side beam 302 is longer than the height of the carrier's 300 cylindrical shape so that each side beam 302 extends past both of the ends of the generally cylindrical shape of carrier 300.

Two end frames 304 are attached to each side beam 302, preferably one end frame 304 at each end of each side beam 302. Each end frame 304 is generally semi-annular in shape having an inner surface 314, an outer surface 316, and two end frame free ends 318. Preferably, each end frame free end 318 is attached to a side beam 302, at the end of each side beam 302.

Two thrust frames 308 are attached to one of the two end frames 304, one trust frame 308 at each of the two end frame free ends 318. Each thrust frame 308 includes a first end 320 and a second end 322. Thrust frame first end 320 is pivotally connected to the corresponding end frame free end 318. With structural core 100 held by carrier webbing 306, thrust frame second end 322 is attached to the end of airlock 142 distal to end plate 106. The carrier 300 is attached to the payload bay transporter at launch trunnion connections 324.

IN OPERATION

On earth, the module 10 is first assembled into its launch configuration 410. As previously disclosed, in the launch configuration 410, the thickness or interior of the inflatable shell 200, in particular the spacing layers 224 of M/OD shield assembly 214, is collapsed or shrunk by vacuum, and the inflatable shell 200 is deflated, collapsed, and efficiently folded around the structural core 100 and fairing 134. The launch restraint 400 maintains the inflatable shell 200 in its collapsed and folded arrangement around the structural core 100. It is also noted that inflatable shell 200 is already sealingly attached, as previously disclosed, to the end rings 116 in the launch configuration 410.

Once assembled into the launch configuration 410, the module 10 is positioned within the launch vehicle payload bay inside of an appropriate payload transporter. In an alternative embodiment, module 10 is positioned inside of carrier 300 and carrier 300 is positioned within the launch vehicle payload bay secured thereto as previously disclosed.

The launch vehicle next lifts off from earth towards lower earth orbit. Module 10 must adequately react the large loads and forces developed during lift off. Due to its interconnected and re-enforced design, module 10 is able to adequately react such forces and loads.

The forces and loads created during lift off are reacted by the structural core 100, specifically the longerons 102, body rings 104, endplates 106, end rings 116, shelves 114 (in their cruciform configuration 128), and airlock 142. The primary axial/longitudinal launch loads are reacted by such elements due to their interconnection as has been disclosed herein. This interconnection results in a direct and efficient load path for reacting the primary axial/longitudinal launch loads. The inertial loads created during lift-off by the support system structures 144, which are attached to the shelves 114 at this stage, are initially reacted by the shelves 114 and are passed on to the other elements according to the load path of the structural core 100.

It is noted that, as a result of the load path and their elongated shape, the longerons 102 are under generally compressive stress and tend to buckle during launch. As previously disclosed herein, a body ring 104 is attached at each pre-determined longeron 102 buckling mode node location thereby imparting sufficient lateral stiffness to the longerons 102 to prevent such buckling.

In the embodiment including carrier 300, carrier webbing 306 reacts the transverse payload inertial loads created during lift off. In addition, carrier webbing 306 evenly distributes such loads preventing high bending loads from being induced into the structural core 100. Side beams 302 react the payload transverse inertial loads which are passed through the carrier webbing 306 and transmit such loads to the launch trunnion connections 324. Furthermore, thrust frames 308 react the primary axial launch loads from the payload and also transmit these loads to the launch trunnion connections 324.

After lift off and once the launch vehicle has stabilized in orbit, the module 10 is now ready to begin its transformation from the launch configuration 410 to the deployed configuration 430. The payload bay doors are opened, the module 10 is taken out of the payload bay from its payload transporter (or carrier 300 in the relevant embodiment), and the module 10 is ready for deployment To deploy, the launch restraint 400 is unfastened from around the inflatable shell 200. The inflatable shell 200 will likely expand into a rough semblance of its deployed shape, a circular cylinder 202 with semi-toroidal ends 204. This initial expansion is partially due to the vacuum of space as well as the general structural shape provided by the spacing layer 224 of inflatable shell 200. In addition, in the embodiment including open cell foam, each open cell foam is collapsed or shrunk by vacuum evacuation for the launch configuration 410. Once the restraint 400 is released, the open cell foam will naturally return to its original thickness also aiding in such expansion.

The wall of inflatable shell 200 is then inflated by use of an inflation system. Specifically, the inflatable shell 200 is inflated by pumping a gas into the interior of the inflatable shell 200. The inflation system may be carried into orbit attached to one of the endplates 106 or within the launch vehicle payload bay. The inflatable shell 200 is inflated up to an atmospheric condition appropriate for human habitation. It is noted that the sealing connection provided by the end rings 116 between the structural core 100 and the inflatable shell 200 prevents gas from leaking out of the interior of the inflatable shell 200. It is also noted that during the inflation of inflatable shell 200, fairing 134 provides a clean interface to the inflatable shell 200 to prevent snagging and ensure a clean deployment.

At this point, the plurality of shape rings 218 are also inflated and properly placed on their respective hook and pile systems on inner liner 206. Not only do the shape rings 218 aid in maintaining the shape of inflatable shell 200, but they also provide mounting locations for removable shelves 114 and fairing 134 along the inner liner 206 thereby eliminating the potential for damage of the inflatable shell 200 and the plurality of bladders 208 therein.

Once fully inflated, the module 10 is in the deployed configuration 430 and has the shape of a circular cylinder 202 with semi-toroidal ends 204. The complete inflation of inflatable shell 200 creates pressure loads on the module 10 which, like the loads and forces created during lift-off, must also be adequately reacted by the module 10. Such pressure forces and loads are reacted primarily by the longerons 102, the endplates 106, the end rings 116, and the structural restraint 212. The interconnection between the structural restraint 212 and the end rings 116, the end rings 116 and the end plates 106, and the end rings 116 and the longerons 102 provides the necessary load path to adequately react such pressure loads.

In addition, because each of the bladders 208 is designed to be geometrically slightly larger than the structural restraint 212, the bladders 208, after full inflation of inflatable shell 200, are under minimal tension, if any. It should also be noted that the preferred shape of the module 10 was chosen to reduce the overall pressure loads acting on the module 10 once the inflatable shell 200 is fully inflated into its deployed configuration 430.

In the first embodiment 190 of end ring 116, each end ring 116 is designed to position the deadman 404 tangentially in line with the membrane forces of the structural restraint 212 placing the deadman retainer bolts 420 in shear instead of tension. This same load characteristic is apparent in the second embodiment 192 of end ring 116 in which the bolts connecting attachment ring 182 to end ring 116 are in shear instead of tension sue to the relative parallel position between attachment ring outer surface 185, structural restraint 212, and primary end ring area 149.

Next, fairing 134 is converted from its first configuration 137 to its second configuration 139. In the first configuration 137, fairing 134 is disposed around the perimeter of the structural core 100. In the second configuration 139, fairing 134 is re-arranged to provide a suitable habitation and work environment to the interior of the inflatable shell 200. As previously disclosed, fairing 134 comprises two embodiments: a horizontal fairing 250 and a vertical fairing 135, each having its own distinct first and second configurations, 137 and 139.

For horizontal fairing 250, in its first configuration 252, each strut 256 is pivoted so that its strut body 262 is adjacent and parallel to longerons 102. Each floor segment 264 is attached to struts 256 that are immediately adjacent to each other on each body ring 104. Each floor segment 264 is partially folded onto itself between its corresponding struts 256.

In order to move the horizontal fairing 250 into its second configuration 254, the struts 256 are pivoted about their first ends 258 so that strut body 262 is normal to and strut second end 260 is distal to its corresponding body ring 104. When immediately adjacent struts 256 are placed in their second configuration 254, their attached floor segment 264 becomes taut therebetween.

In order to lock and solidify the horizontal fairing 250 in its second configuration 254, a shelf 114 is attached to the shelf-to-shelf attachment means 130 of two struts 256 that are in the same longitudinal plane (with reference to longitudinal axis 101). Such a connection prevents struts 256 from further pivoting motion thereby locking each strut 256 in the correct position. It is noted that because, in the preferred embodiment, at least one cruciform pattern component 129 extends the distance between two adjacent body rings 104, at least one set of shelves 114, those that comprise such cruciform pattern component 129, are the correct size to be attached between two struts 256 in the same longitudinal plane. The removal of shelves 114 from their cruciform configuration 128 will be disclosed herein.

In its first configuration 141, vertical fairing 135 completely encloses and surrounds structural core 100. In order to move vertical fairing 135 from its first configuration 141 to its second configuration 143, vertical fairing 135 is first detached into the plurality of curved fairing segments 138. Because vertical fairing 135 is constructed from a bent but naturally flat material, when the vertical fairing 135 is detached into its components, each fairing segment 138 returns to its natural, unstressed flat disposition.

Each fairing segment 138 is then moved so that its extends radially between a longeron outer surface 103 and the inflatable shell 200. Longeron-to-fairing segment attachment means provides selectively releasable attachment to longeron 102 and fairing segment 138.

From FIGS. 8 and 9, it can be seen that horizontal fairing 250 in its second configuration 254 provides module 10 with a living space that is divided into "floors", with definite up and down orientations. On the other hand, from FIGS. 6 and 7, vertical fairing 135 in its second configuration 143 provides module 10 with a living space that is divided into "quadrants" around structural core 100, with no definite up or down orientations.

The last step in transforming the module 10 into its deployed configuration 430 is the re-arrangement of the shelves 114 from their current cruciform pattern 128 to an arrangement suitable for human habitation and work within inflatable shell 200. Each shelf 114 that is to be moved must first be detached from the other shelves of the cruciform pattern 128. This detachment is easily performed by detaching the shelf-to-shelf attachment means 130 of the shelf 114 to be moved. The removed shelf 114 is then moved to its re-arranged position, as partially shown in FIG. 9, and attached in such position by mateable attachment between the shelf-to-shelf attachment means 130 and a strut-to-shelf attachment means (if attached to a strut 256), a fairing-to-shelf attachment means (if attached to a fairing 134), a shelf-to-shelf attachment means 130 (if attached end to end to another shelf 114), or a shelf attachment point 120 (if attached to the body of another shelf 114).

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

We claim:

1. An inflatable module, comprising:
 a structural core including two endplates, an end ring attached to each endplate, and at least one longeron attached to each end ring and intermediate thereof;
 an inflatable shell;
 said inflatable shell sealingly attached to said end rings and enclosing said at least one longeron; and
 said structural core and said inflatable shell having a launch configuration, in which said inflatable shell is collapsed, deflated, and folded around each of said at least one longeron in said launch configuration and a deployed configuration, in which said inflatable shell is inflated and surrounds said structural core thereby defining an enclosed space interior to said inflatable shell.

2. A module as claimed in claim 1, wherein:
 said inflatable shell having a wall thickness shrunk by vacuum in said launch configuration; and
 said inflatable shell wall thickness being expanded in said deployed configuration.

3. A module as claimed in claim 1, wherein said structural core further comprises:
 a cylindrical water tank with an annular cross-section;
 said water tank disposed around each of said at least one longeron and interior to said inflatable shell; and
 said water tank providing radiation environmental protection to said module in the event of solar radiation activity.

4. A module as claimed in claim 1, wherein said structural core further comprises:

at least one body ring attached to each of said at least one longeron; and one of said at least one body rings surrounding and attached to each of said at least one longeron at a buckling mode node location of said at least one longeron.

5. A module as claimed in claim 4, wherein said structural core further comprises:

a plurality of shelves;

said plurality of shelves removably and securely positioned interior to said at least one longeron in said launch configuration; and said plurality of shelves rearranged interior to said inflatable shell to an arrangement suitable for human habitation and work in said deployed configuration.

6. A module as claimed in claim 5, wherein:

said structural core has a longitudinal axis; and said plurality of shelves are selectively removably interlocked proximal said longitudinal axis thereby reinforcing said at least one longeron in said launch configuration.

7. A module as claimed in claim 6, wherein:

said plurality of shelves are selectively removably interlocked in a cruciform pattern; and said cruciform pattern extends between and are selectively removably attached to said two end plates.

8. A module as claimed in claim 7, wherein:

said cruciform pattern comprises a plurality of cruciform pattern components interconnected to establish the shape of said cruciform pattern; and each of said cruciform pattern components comprising said selectively removably interlocked shelves.

9. A module as claimed in claim 8, wherein each of said plurality of shelves is constructed in the form of an isogrid pattern.

10. A module as claimed in claim 9, wherein:

each of said plurality of shelves has a generally rectangular shape and includes two opposite first ends and two opposite second ends;

each of said plurality of shelves includes a plurality of shelf-to-shelf attachment means on each of said two opposite first ends and said two opposite second ends;

each of said shelf-to-shelf attachment means is selectively releasably mateable with other of said shelf-to-shelf attachment means;

so that, when interlocked into said cruciform pattern, each of said plurality of shelves is releasably attached by way of shelf-to-shelf attachment means to at least two other of said plurality of shelves.

11. A module as claimed in claim 1, wherein:

said structural core has a cylindrical shape including a longitudinal axis and two circular ends;

said two endplates correspond to said circular ends of said cylindrical shape;

each of said two end rings are concentrically attached to said corresponding endplate;

each of said at least one longeron extends in a direction parallel to said longitudinal axis along the periphery of said cylindrical shape; and each of said at least one longeron is spaced apart about the periphery of said cylindrical shape parallel to said longitudinal axis.

12. A module as claimed in claim 11, wherein said structural core further comprises:

a fairing;

said fairing disposed around said structural core in said launch configuration;

said inflatable shell collapsed, deflated, and folded around said fairing in said launch configuration; and said fairing rearranged interior to said inflatable shell in said deployed configuration.

13. A module as claimed in claim 12, wherein:

said structural core comprises at least one body ring attached to each of said at least one longeron;

said fairing comprises a horizontal fairing;

said horizontal fairing comprises a plurality of struts and a plurality of floor segments;

each of said plurality of struts being pivotally attached at a first strut end to one of said body rings; and each of said plurality of floor segments being attached to and between two of said adjacent struts.

14. A module as claimed in claim 13, wherein:

said horizontal fairing includes a first configuration corresponding to said launch configuration and a second configuration corresponding to said deployed configuration;

each of said plurality of struts being pivoted about said first strut end so that said strut is adjacent to said structural core in said first configuration; and each of said plurality of struts being pivoted about said first strut end so that said strut is perpendicular to said corresponding body ring and extends radially from said longitudinal axis in said second configuration.

15. A module as claimed in claim 14, wherein:

each of said plurality of floor segments constructed from a flexible and sturdy material; and each of said plurality of floor segments having a shape such that each of said plurality of floor segments is taut between and parallel to said corresponding two adjacent struts in said second configuration.

16. A module as claimed in claim 15, wherein:

said structural core further comprises a plurality of shelves;

each of said plurality of shelves including a plurality of shelf-to-shelf attachment means;

each of said plurality of struts including a plurality of strut-to-shelf attachment means;

each of said plurality of said strut-to-shelf attachment means selectively releasably mateable with each of said plurality of said shelf-to-shelf attachment means thereby allowing the attachment of at least one of said plurality of shelves to two of said plurality of struts, said two struts being in the same longitudinal plane and in said second configuration;

thereby stabilizing and solidifying the position of said two struts in their second configuration.

17. A module as claimed in claim 12, wherein:

said fairing comprises a vertical fairing;

said vertical fairing having a generally cylindrical shape and surrounding at least an annular section of said structural core in said launch configuration; and said vertical fairing comprises a plurality of detachable curved fairing segments.

18. A module as claimed in claim 17, wherein:

said vertical fairing includes a first configuration corresponding to said launch configuration and a second configuration corresponding to said deployed configuration;

said plurality of curved fairing segments being attached together and surrounding at least an annular section of said structural core in said first configuration; and said plurality of curved fairing segments being detached from each other and each being positioned to extend radially from said longitudinal axis between one of said plurality of longerons and said inflatable shell in said second configuration.

19. A module as claimed in claim 1, wherein said inflatable shell comprises a multi-layer construction of soft goods.

20. A module as claimed in claim 19, wherein said multi-layer construction of soft goods comprises:

a plurality of inner layers proximate said structural core;

a plurality of outer layers distal said structural core; and a structural restraint intermediate said plurality of inner layers and said plurality of outer layers.

21. A module as claimed in claim 20, wherein said plurality of inner layers comprises:

an inner liner proximate said structural core;

a plurality of bladders disposed intermediate said inner liner and said structural restraint; and a bleeder cloth disposed between each of said plurality of bladders.

22. A module as claimed in claim 20, wherein said plurality of outer layers comprises:

an outer liner; and a meteoroid orbital debris assembly disposed intermediate to said structural restraint and said outer liner.

23. A module as claimed in claim 22, wherein said meteoroid orbital debris assembly comprises:

a plurality of bumper layers; and a spacing layer separating each of said plurality of bumper layers.

24. A module as claimed in claim 23, wherein said meteoroid orbital debris assembly further comprises an adhesive thinly coated on each of said plurality of bumper layers.

25. A module as claimed in claim 23, wherein each of said spacing layers includes gaps creating hinge lines on said inflatable shell thereby enabling the folding arrangement of said inflatable shell in said launch configuration.

26. A module as claimed in claim 25, wherein each of said spacing layers comprises intermittently cored out open cell foam.

27. A module as claimed in claim 1, further comprising:

a launch restraint; and said launch restraint selectively maintaining said inflatable shell collapsed and folded around said structural core in said launch configuration.

28. A module as claimed in claim 27, wherein:

said launch restraint comprises a rip cord mechanism; and said rip cord mechanism being releasable by a pulling motion thereby allowing said inflatable shell to attain its deployed configuration.

29. A module, for use in space or other environments, comprising:

said module having a launch configuration and a deployed configuration;

said module having a generally cylindrical shape in said launch configuration;

said module having an inflatable shell comprising a wall, the thickness of said wall being shrunk by vacuum in said launch configuration;

said module being inflated and said inflatable shell wall thickness being expanded in said deployed configuration providing a module interior volume larger than in said launch configuration; and said module having a generally cylindrical shape with semi-toroidal ends in said deployed configuration.

30. A module, for use in space or other environment, comprising:

a launch configuration and a deployed configuration;

a structural core;

a plurality of selectively removable shelves;

said plurality of shelves centrally located in said module in said launch configuration;

said plurality of shelves rearranged throughout the interior of said module in said deployed configuration; and said plurality of shelves selectively removably interlocked within said structural core in said launch configuration thereby reinforcing said structural core.

31. A module as claimed in claim 30, wherein said plurality of shelves are selectively removably interlocked in a cruciform pattern.

32. A module as claimed in claim 31, wherein:

said structural core comprises two end plates; and said cruciform pattern extends between and selectively removably attached to said two end plates.

33. A module as claimed in claim 31, wherein:

said cruciform pattern comprises a plurality of cruciform pattern components interconnected at edges thereof, thereby establishing the shape of said cruciform pattern; and each of said cruciform pattern components comprises said plurality of shelves.

34. A module, for use in space or other environments, comprising:

a structural core;

an inflatable shell comprising an inner liner, a plurality of bladders disposed exterior to said inner liner, and a bleeder cloth disposed between each of said plurality of bladders; and said inner liner and said plurality of bladders sealingly attached to said structural core.

35. A module as claimed in claim 34, wherein:

said inflatable shell has two ends;

said plurality of bladders are sealed together to create a single bladder adjacent each of said inflatable shell two ends; and said single bladder and said inner liner are sealingly attached to said structural core.

36. A module, for use in space or other environments, comprising:

a structural core;

an inflatable shell comprising an outer liner, a plurality of bumper layers positioned interior to said outer liner for shocking, vaporizing, and fragmenting meteoroid orbital debris, and a spacing layer separating each of said plurality of bumper layers; and said inflatable shell sealingly attached to said structural core.

37. A module as claimed in claim 36, wherein:

said module has a launch configuration and deployed configuration;

each of said spacing layers is vacuum shrunk in said launch configuration thereby decreasing the overall thickness of said inflatable shell in said launch configuration; and each of said spacing layers is expanded from its vacuum shrunk state in said deployed configuration.

38. A module as claimed in claim 37, wherein each of said spacing layers comprise intermittently cored out open cell foam.

39. A module, for use in space or other environments, comprising:

a structural core;

an inflatable shell comprising a plurality of inner layers located proximate to said structural core and a meteoroid orbital debris assembly located exterior to said plurality of inner layers;

said plurality of inner layers sealingly attached to said structural core; and said meteoroid orbital debris assembly for shocking, vaporizing, and fragmenting incoming meteoroid orbital debris.

40. An inflatable module, comprising:

a structural core;

an inflatable shell;

said inflatable shell sealingly attached to said structural core;

said structural core and said inflatable shell having a launch configuration, in which said inflatable shell is collapsed and deflated, and a deployed configuration, in which said inflatable shell is inflated and surrounds said structural core thereby defining an enclosed space interior to said inflatable shell;

said inflatable shell having a wall thickness shrunk by vacuum in said launch configuration; and said inflatable shell wall thickness being expanded in said deployed configuration.

41. A module as claimed in claim 40, wherein said structural core further comprises:

two end plates;

an end ring attached to each end plate;

at least one longeron attached to each end ring and intermediate thereof;

a cylindrical water tank with an annular cross-section;

said water tank disposed around each of said at least one longeron and interior to said inflatable shell; and said water tank providing radiation environmental protection to said module in the event of solar radiation activity.

42. A module as claimed in claim 41, wherein said structural core further comprises:

at least one body ring attached to each of said at least one longeron; and one of said at least one body rings surrounding and attached to each of said at least one longeron at a buckling mode node location of said at least one longeron.

43. A module as claimed in claim 41, wherein:

said structural core has a cylindrical shape including a longitudinal axis and two circular ends;

said two endplates correspond to said circular ends of said cylindrical shape;

each of said two end rings are concentrically attached to said corresponding endplate;

each of said at least one longeron extends in a direction parallel to said longitudinal axis along the periphery of said cylindrical shape; and each of said at least one longeron is spaced apart about the periphery of said cylindrical shape parallel to said longitudinal axis.

44. A module as claimed in claim 40, wherein said inflatable shell comprises a multi-layer construction of soft goods.

45. A module as claimed in claim 40, further comprising:

a launch restraint; and said launch restraint selectively maintaining said inflatable shell collapsed and folded around said structural core in said launch configuration.

* * * * *